United States Patent
Filsfils et al.

(10) Patent No.: US 10,764,175 B1
(45) Date of Patent: Sep. 1, 2020

(54) VALIDATING RESOURCE ISOLATION BETWEEN NETWORK SLICES IN A MOBILE NETWORK

(71) Applicant: Cisco Technology, Inc., San Jose, CA (US)

(72) Inventors: Clarence Filsfils, Brussels (BE); Zafar Ali, Hicksville, NY (US); Faisal Iqbal, Ottawa (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/358,110

(22) Filed: Mar. 19, 2019

(51) Int. Cl.
*H04L 12/721* (2013.01)
*H04L 12/741* (2013.01)
*H04L 12/723* (2013.01)
*H04L 12/26* (2006.01)
*H04L 12/733* (2013.01)

(52) U.S. Cl.
CPC .............. *H04L 45/72* (2013.01); *H04L 43/12* (2013.01); *H04L 45/20* (2013.01); *H04L 45/34* (2013.01); *H04L 45/50* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 6,266,705 B1* | 7/2001 | Ullum | H04L 12/467 709/238 |
| 8,130,759 B2* | 3/2012 | Cohen | H04L 41/145 370/392 |
| 9,241,044 B2 | 1/2016 | Shribman et al. | |
| 9,374,320 B2 | 6/2016 | Xu et al. | |
| 9,860,152 B2 | 1/2018 | Xia et al. | |
| 9,992,094 B1* | 6/2018 | Singh | H04L 43/14 |
| 10,348,603 B1* | 7/2019 | Singh | H04L 45/7453 |

(Continued)

FOREIGN PATENT DOCUMENTS

| | | |
|---|---|---|
| WO | 2018130305 A1 | 7/2018 |
| WO | 2018149498 A1 | 8/2018 |

OTHER PUBLICATIONS

Li, Jun et al. "SAVE: source address validity enforcement protocol." Proceedings of the 21st Annual Joint Conference of the IEEE Computer and Communications Societies. vol. 3, pp. 1557-1566. IEEE Press. Jan. 2002. (Year: 2002).*

(Continued)

*Primary Examiner* — Jeffrey R Swearingen
(74) *Attorney, Agent, or Firm* — Edell, Shapiro & Finnan, LLC

(57) ABSTRACT

In one illustrative example, a router node is configured for use in a network having a plurality of interconnected router nodes for routing packets according to segment routing (SR). Router nodes of a first network slice are configured to establish routes based on first path determination criteria associated with a first identifier, and router nodes of a second network slice are configured to establish routes based on second path determination criteria associated with a second identifier. Each router node in the first network slice may operate as a unit under test (UUT) and validate isolation from network resources in the second network slice. An operator of the network may be alerted when an isolation failure is detected.

20 Claims, 15 Drawing Sheets

(56) References Cited

U.S. PATENT DOCUMENTS

| | | | | |
|---|---|---|---|---|
| 2007/0025328 | A1* | 2/2007 | Cohen | H04L 45/02 370/351 |
| 2018/0013841 | A1* | 1/2018 | Nainar | H04L 67/10 |

OTHER PUBLICATIONS

Zbigniew Kotulski et al., "On end-to-end approach for slice isolation in 5G networks. Fundamental challenges", Proceedings of the Federated Conference on Computer Science and Information Systems pp. 783-792, ISSN 2300-5963 ACSIS, vol. 11, DOI: 10.15439/2017F228, Sep. 2017, 10 pages.

C. Filsfils et al., "SRv6 Network Programming", draft-filsfils-spring-srv6-network-programming-04, SPRING, Internet-Draft, Intended status: Standards Track, Cisco Systems, Inc., Mar. 4, 2018, 57 pages.

S. Previdi, Ed. et al., "IPv6 Segment Routing Header (SRH)", draft-ietf-6man-segment-routing-header-07, Network Working Group, Internet-Draft, Intended status: Standards Track, Jul. 20, 2017, 34 pages.

P. Psenak, Ed. et al., "IGP Flexible Algorithm", draft-ietf-lsr-flex-algo-01.txt, Network Working Group, Internet-Draft, Intended status: Standards Track, Nov. 12, 2018, 23 pages.

George Swallow et al., "Label Switching Router Self-Test", draft-ietf-mpls-lsr-self-test-02.txt, Network Working Group, Internet Draft, Category: Standards Track, Feb. 2004, 20 pages.

C. Filsfils, Ed. et al., "Segment Routing Architecture", draft-ietf-spring-segment-routing-14, Network Working Group, Internet-Draft, Intended status: Standards Track, Dec. 20, 2017, 31 pages.

K. Makhijani, ed et al., "Network Slicing Use Cases: Network Customization and Differentiated Services", draft-netslices-usecases-02, Internet-Draft, Intended status: Informational, Oct. 18, 2017, 21 pages.

Cisco Systems, Inc., "Generic Online Diagnostics on the Cisco Catalyst 6500 Series Switch", downloaded Mar. 7, 2019, 12 pages.

A. Conta et al., "Internet Control Message Protocol (ICMPv6) for the Internet Protocol Version 6 (IPv6) Specification", Network Working Group, Request for Comments: 4443, Obsoletes: 2463, Updates: 2780, Category: Standards Track, Mar. 2006, 24 pages.

A. Atlas, Ed. et al., "Extending ICMP for Interface and Next-Hop Identification", Internet Engineering Task Force (IETF), Request for Comments: 5837, Category: Standards Track, ISSN: 2070-1721, Apr. 2010, 18 pages.

D. Katz et al., "Bidirectional Forwarding Detection (BFD) for Multihop Paths", Internet Engineering Task Force (IETF), Request for Comments: 5883, Category: Standards Track, ISSN: 2070-1721, Jun. 2010, 6 pages.

K. Kompella et al., "Detecting Multiprotocol Label Switched (MPLS) Data-Plane Failures", Internet Engineering Task Force (IETF), Request for Comments: 8029, Obsoletes: 4379, 6424, 6829, 7537, Updates: 1122, Category: Standards Track, ISSN: 2070-1721, Mar. 2017, 78 pages.

* cited by examiner

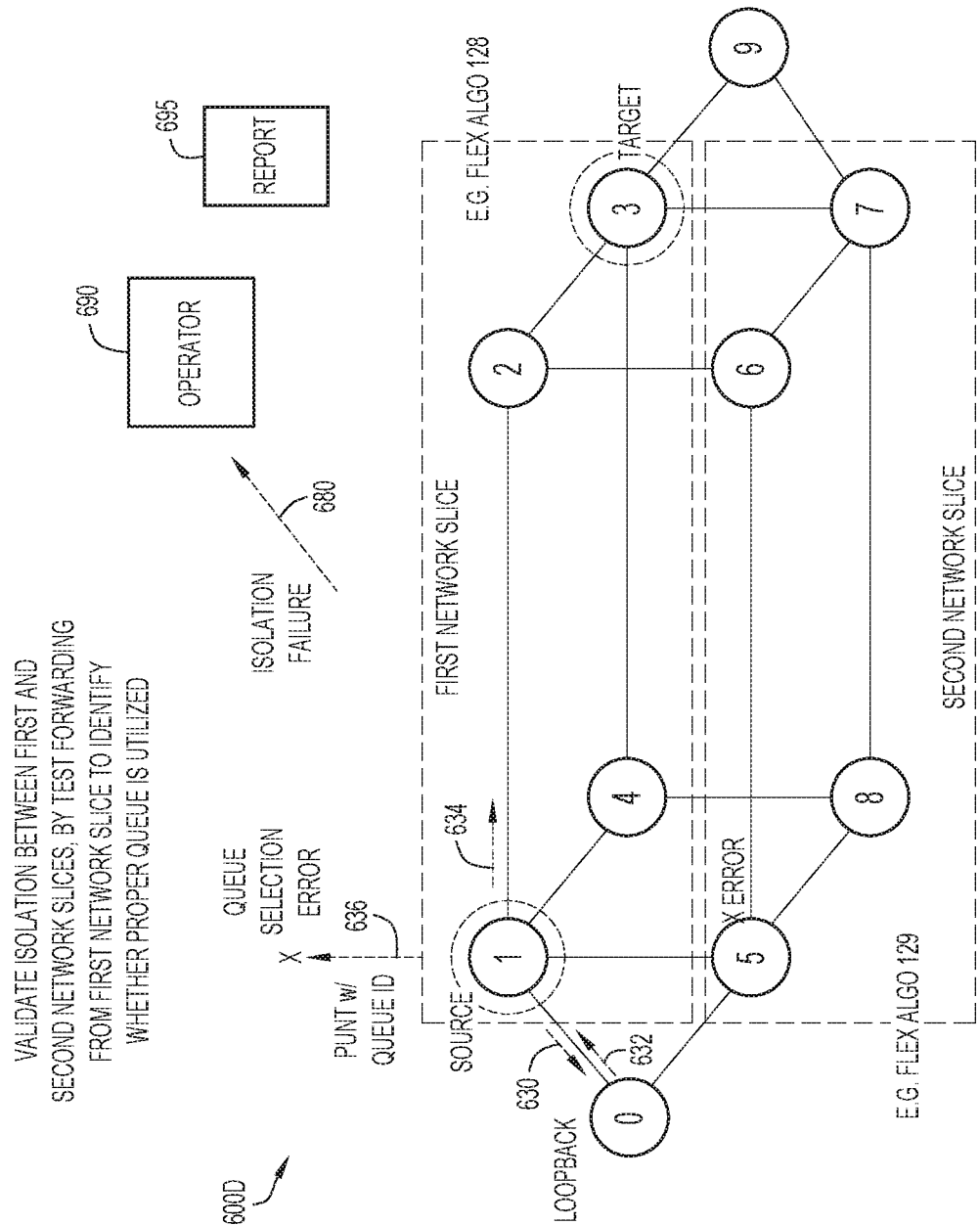

VALIDATING RESOURCE ISOLATION BETWEEN NETWORK SLICES IN A MOBILE NETWORK

TECHNICAL FIELD

The present disclosure relates generally to networks configured to allocate network resources with use of network slicing, and more particularly to techniques for validating resource isolation between network slices in such a network.

BACKGROUND

Network slicing is a requirement in fifth generation (5G) mobile networks which may utilize segment routing (SR) for the routing of packets. Each network slice in the mobile network may be topologically different from other network slices but share the same common core. A network slice has a set of physical resources allocated to it, and all traffic associated with the slice should only use those allocated resources.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A-6D are illustrative representations of the interconnected router nodes corresponding to the flowcharts of FIGS. 5A-5D.

DESCRIPTION OF EXAMPLE EMBODIMENTS

Figure 1A:
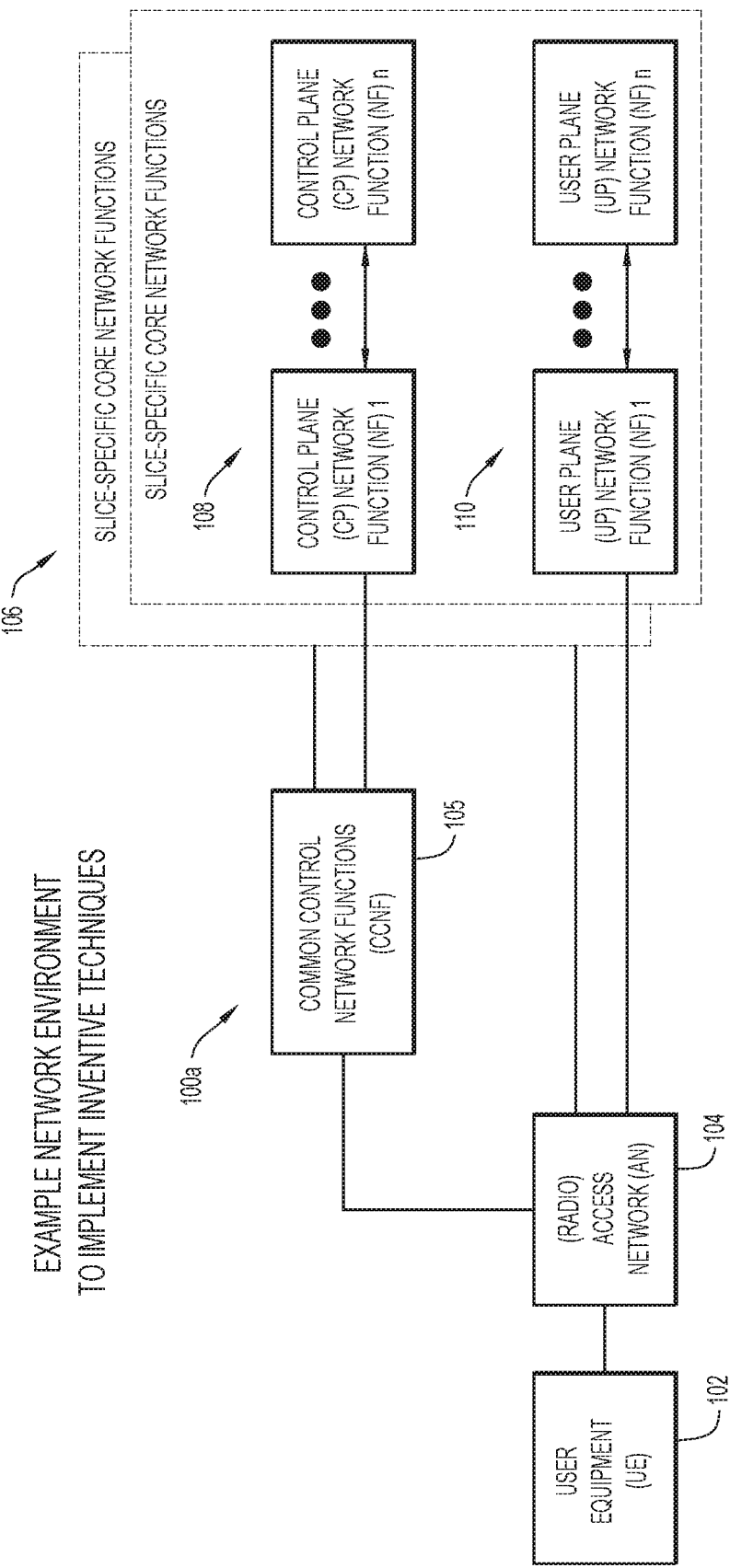
FIG. 1A is an illustrative representation of a basic network architecture of a Fifth Generation (5G) mobile network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in validating isolation of network slices of a network are described herein.

In one illustrative example, a router node may be configured for use in a mobile network which has a plurality of interconnected router nodes for routing packets according to segment routing (SR). The interconnected router nodes include a first plurality of router nodes of a first network slice and a second plurality of router nodes of a second network slice. Each router node of the first network slice may be configured to establish routes based on first path determination criteria associated with a first identifier, and each router node of the second network slice may be configured to establish routes based on second path determination criteria associated with a second identifier. In some implementations, each path determination criteria may be part of a flexible algorithm definition which may include a calculation-type, a metric-type, and a set of constraints for path determination.

The router node of the first network slice may be configured to validate isolation from network resources used in the second network slice. For example, operating as a unit under test (UUT), the router node may perform a validation procedure with respect to each one of a plurality of forwarding table entries at the router node. Here, the router node may forward a probe message towards a target downstream router node according to the forwarding table entry, where the probe message includes the first identifier associated with the router node. When a response message is received from a receiving router node associated with the second identifier, which indicates a discrepancy with the first identifier, the router node may identify a failure of isolation from network resources in the second network slice, and alert or otherwise indicate the failure to an operator of the mobile network.

In some implementations, the probe message may be a loopback probe message which is injected to an upstream router node and looped back to the router node for forwarding to the target downstream router node.

More detailed and alternative techniques and implementations are provided herein as described below.

Example Embodiments

What is described herein are one or more techniques and mechanisms for validating resource isolation between network slices of a network. For example, one or more techniques may be used to locally validate that traffic in a network slice only utilizes the links and other resources assigned to it. The one or more techniques may also be used to verify that traffic from one of the network slices does not leak into another network slice in the common core. The one or more techniques may also be used to validate whether the queuing for Quality of Service (QoS) treatment associated with the network slice is being properly applied.

In some implementations, techniques of the present disclosure may be applied to a mobile network, such as a 5G mobile network. To better illustrate, FIG. 1A is an illustrative representation of a network architecture 100A of a 5G mobile network. The mobile network is configured to facilitate communications for a user equipment (UE) 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
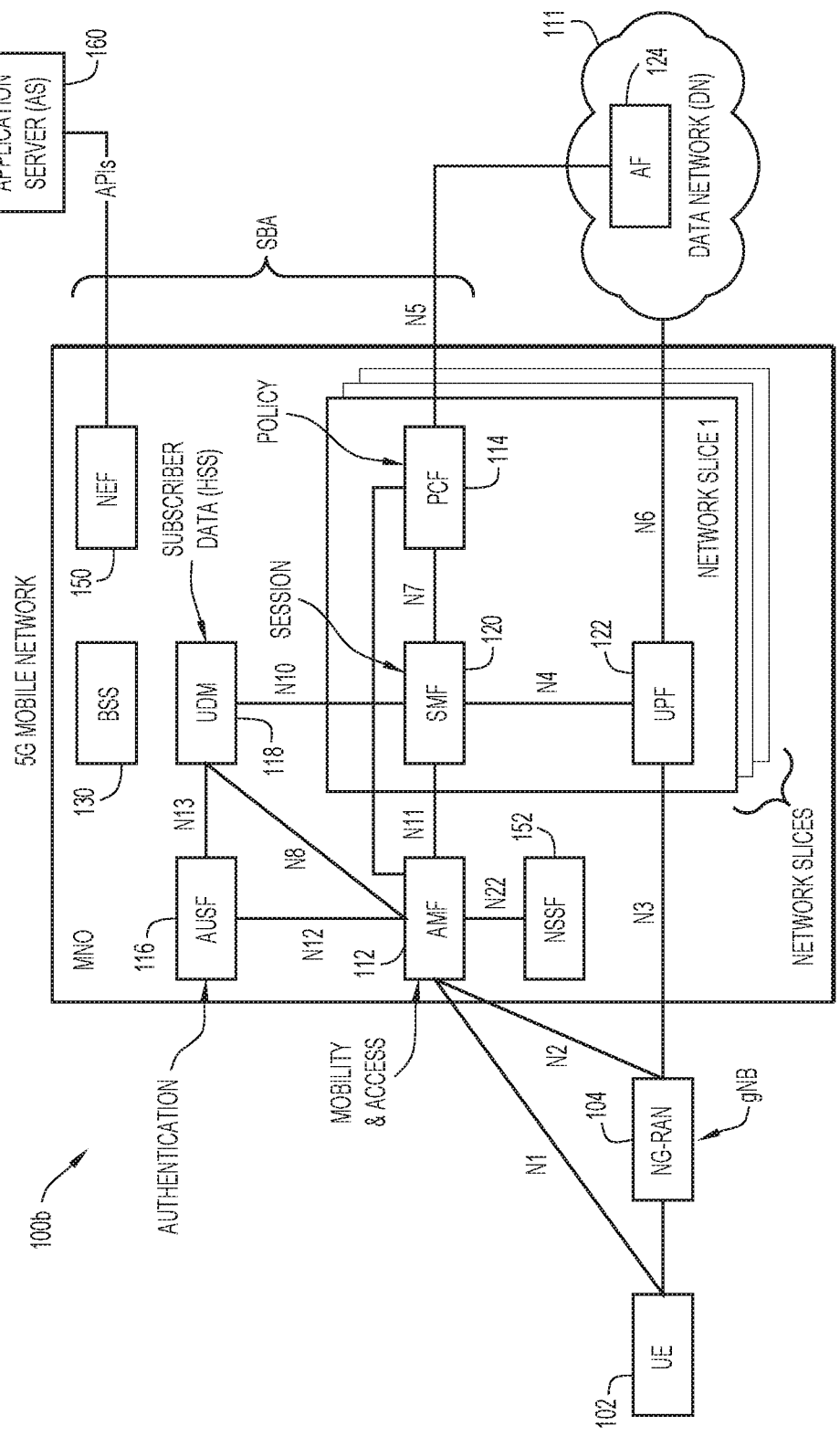
FIG. 1B is an illustrative representation of a more detailed network architecture of the mobile network of FIG. 1A.

FIG. 1B is an illustrative representation of a more detailed network architecture 100B of the 5G mobile network of FIG. 1A. As provided in 3GPP standards for 5G (e.g. 3GPP 23.501 and 23.502), network architecture 100b for the 5G mobile network which is operated by a mobile network operator (MNO) may include an authentication server function (AUSF) 116, a unified data management (UDM) 118 (having a unified data repository or UDR), an AMF 112, a policy control function (PCF) 114, an SMF 120, and a UPF 122. A plurality of interfaces and/or reference points N1-N8, N10-N13, N15, and N22 shown in FIG. 1B (as well as others) may define the communications and/or protocols between each of the entities, as described in the relevant (evolving) standards documents. One or more application functions, such as an application function (AF) 124, of a data network (DN) 111 may connect to the 5G mobile network via PCF 114 or UPF 122.

UPF 122 is part of the user plane and all other NFs (i.e. AMF 112, SMF 120, PCF 114, AUSF 116, and UDM 118) are part of the control plane. Separation of user and control planes guarantees that each plane resource can be scaled independently; it also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120 and UPF 122 of FIG. 1B may be provided as specific instances in a first network slice (e.g., network slice 1) of a plurality of network slice instances made available in the mobile network.

Also as shown in FIG. 1B, a network exposure function (NEF) 150 may be provided in the mobile network. In general, NEF 150 may be configured to receive information from other NFs (e.g. based on exposed capabilities of other NFs) and store the received information as structured data. The storage operations may be performed with use of a standardized interface to a data storage network function. The stored information may be re-exposed by NEF 150 to other NFs and used for other purposes (e.g. analytics). One example use of NEF 150 is to assist in the establishment of an AS-initiated communication with a UE or IoT device, from an application server (AS) 180 through an API.

Although implementations of the present disclosure may be applied to a 5G mobile network as described herein, it is understood that techniques and mechanisms of the present disclosure may be provided in any suitable type of network that employs network slicing.

In the present disclosure, implementations may make use of segment routing (SR) for communications in the network. The SR may be SR for IPv6 (SRv6). To illustrate a few SRv6 examples, FIGS. 2A and 2B are block diagrams of network nodes which are configured to route packets using SRv6.

Figure 2A:
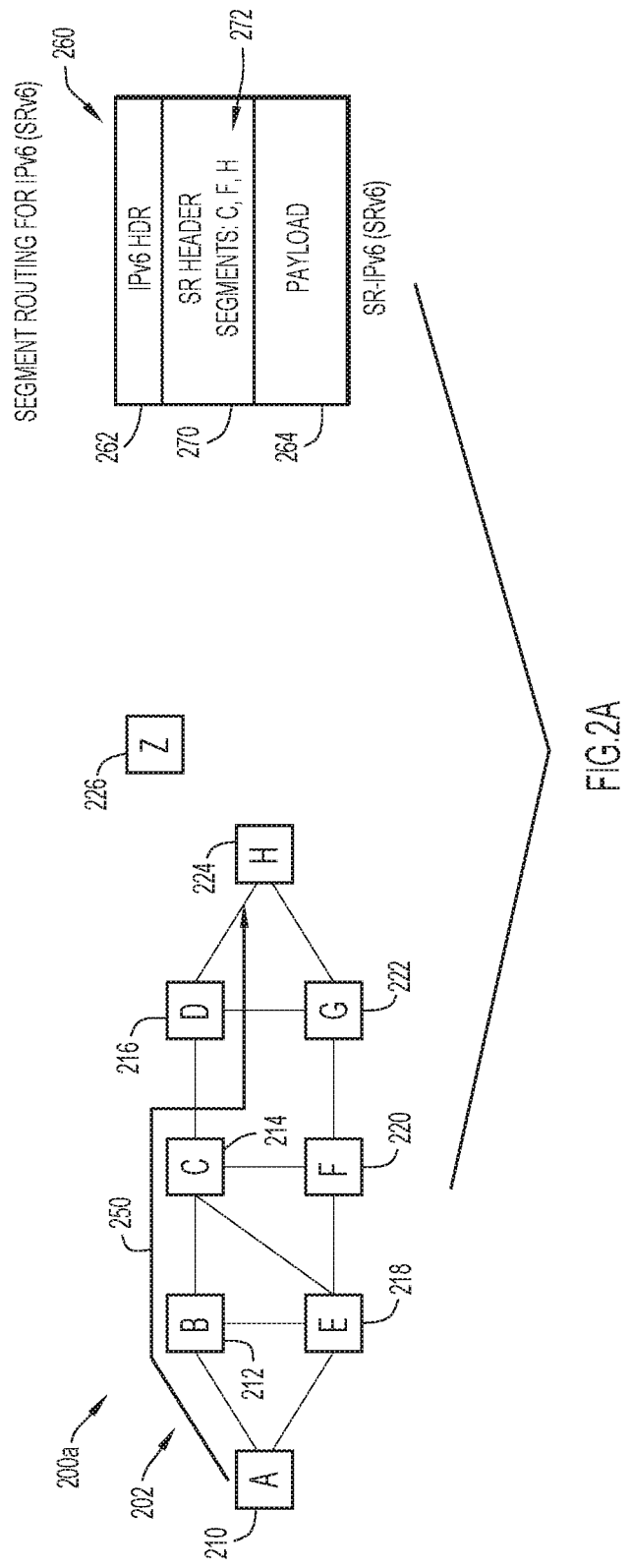
FIGS. 2A and 2B are illustrative block diagrams of communication networks operative to route communications with use of segment routing (SR) and, in particular, with use of SR for IPv6 (SRv6)

With reference first to FIG. 2A, a network 200a which includes a plurality of nodes 202 (e.g. routers, servers, base stations, gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
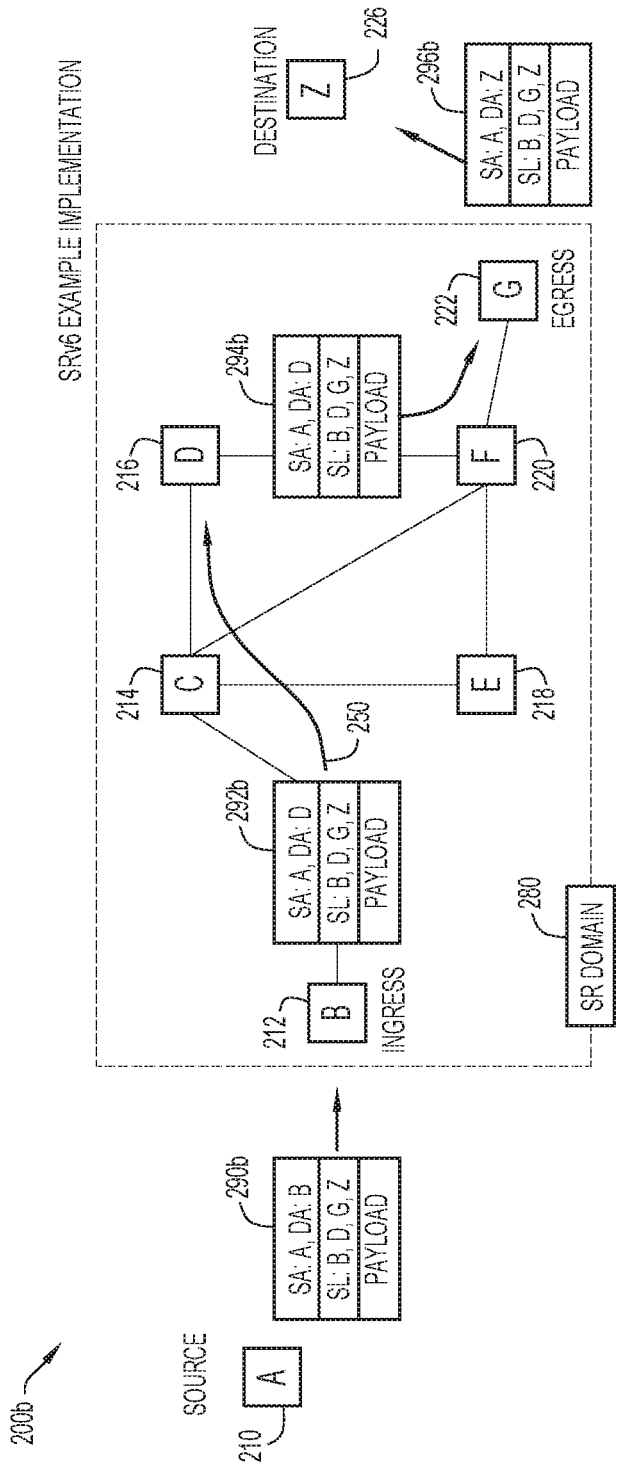

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

An SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290*b*. Here, the SR header of SR-IPv6 packet 290*b* includes an ordered list of segments (SL) designating nodes B, D, G, and Z to define network path 250. Initially, a source address (SA) of SR-IPv6 packet 290*b* is designated as node A and a destination address (DA) of SR-IPv6 packet 290*b* is designated as node B (i.e. the first node in the SL). When SR-IPv6 packet 290*b* is communicated to the ingress node (i.e. node 212 or B), the DA is modified by the ingress node to include the next or second node in the SL (i.e. node D), as indicated in SR-IPv6 packet 292*b*. When SR-IPv6 packet 292*b* is communicated to the node D (via node C), the DA is modified by node D to include the next or third node in the SL (i.e. node G), as indicated in SR-IPv6 packet 294*b*. When SR-IPv6 packet 294*b* is further communicated to the node G (via node F), the DA is modified by node G to include the next or fourth node in the SL (i.e. node Z which is the destination node), as indicated in SR-IPv6 packet 296*b*.

In some implementations, an SR header of an IPv6 packet may be inserted at the ingress node to produce an SR-IPv6 packet. In some other implementations, the source node, which may or may not be SRv6-configured, may originate an IPv6 packet without any SR header where the ingress node operates to encapsulate the IPv6 packet with a new, outer IPv6 header followed by an SR header, to produce an SR-IPv6 packet.

The current state of the art for SRv6 is described in various standards-related documents, including Internet Engineering Task Force (IETF) documents, such as "Segment Routing Architecture" identified by "draft-ietf-spring-segment-routing-14"; "IPv6 Segment Routing Header (SRH)" identified by "draft-ietf-6man-segment-routing-header-07"; and "SRv6 Network Programming" identified by "draft-filsfils-spring-srv6-network-programming-04," C. Filsfils et al., Mar. 4, 2018 (e.g. "forward and punt"), each of which are hereby incorporated by reference as though fully set forth herein. Note that the techniques and mechanisms of the present disclosure are not limited to SRv6, and may be applied to other types of routing, such as SR based on Multiprotocol Label Switching (MPLS).

Figure 3:
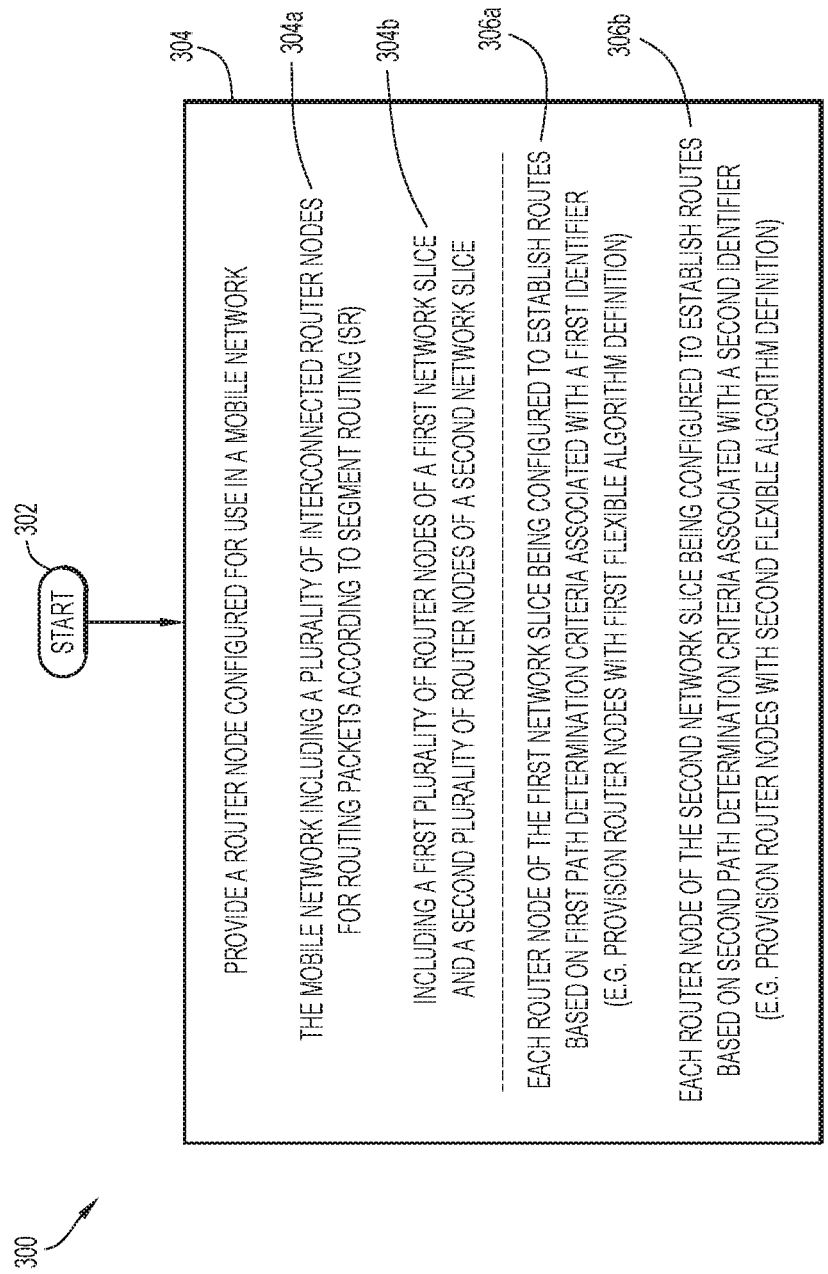
FIG. 3 is a flowchart for describing a method of providing a router node in a mobile network configured to allocate network resources to different network slices.

FIG. 3 is a flowchart 300 for describing a method of providing a router node in a mobile network. The router node may be configured to perform validation of isolation between network slices in the mobile network according to techniques of the present disclosure.

In the method of FIG. 3, a router node may be configured and provided for use in a mobile network (step 304 of FIG. 3). The mobile network may include and/or utilize a plurality of interconnected router nodes for routing packets according to SR (step 304*a* of FIG. 3). The interconnected router nodes may include a first plurality of router nodes of a first network slice and a second plurality of router nodes of a second network slice (step 304*b* of FIG. 3). Each router node of the first network slice may be configured to establish routes based on first path determination criteria associated with a first identifier (step 306*a* of FIG. 3). More specifically, each router node of the first network slice may be configured to populate its forwarding table with forwarding table entries of paths determined according to the first path determination criteria (and e.g. mostly limit its entries to such determined paths). On the other hand, each router node of the second network slice may be configured to establish routes based on second path determination criteria associated with a second identifier (step 306*b* of FIG. 3). More specifically, each router node of the second network slice may be configured to populate its forwarding table with forwarding table entries of paths determined according to the second path determination criteria (and e.g. mostly limit its entries to such determined paths). Such path determination criteria may be provisioned at the router nodes by a controller.

In some implementations, the first path determination criteria may be associated with a first flexible algorithm (first "Flex-Algo") and the second path determination criteria may be associated with a second flexible algorithm (second "Flex-Algo"). Each flexible algorithm definition may include a calculation-type, a metric-type, and a set of constraints for path determination. Here, each router node of the first network slice may be configured to advertise a first prefix SID which includes the first identifier and each router node of the second network slice may be configured to advertise a second prefix SID which includes the second identifier.

The SR Flexible Algorithm is described in various standards-related documents, including IETF documents, such as "IGP Flexible Algorithm," IETF Internet-Draft, draft-ietf-lsr-flex-algo-01.txt, S. Hegde et al., Nov. 12, 2018, which is hereby incorporated by reference as though fully set forth herein. Although techniques of the present disclosure are described herein using the SR Flexible Algorithm, multi-topology or other realizations may be utilized as viable alternatives.

In this context, the router node be configured to perform validation of isolation between network slices (e.g. the first and second network slices) in the mobile network according to techniques of the present disclosure. The router node may include a network slice isolation validator and perform such validation as a unit under test (UUT). In actual practice, the techniques may be performed at each one of a plurality of router nodes of a network slice (e.g. the first plurality of router nodes in the first network slice) for verification of isolation. In some implementations, a controller may coordinate and control each router node of the network slice to operate as a UUT for verification of isolation between network slices.

Figure 4:
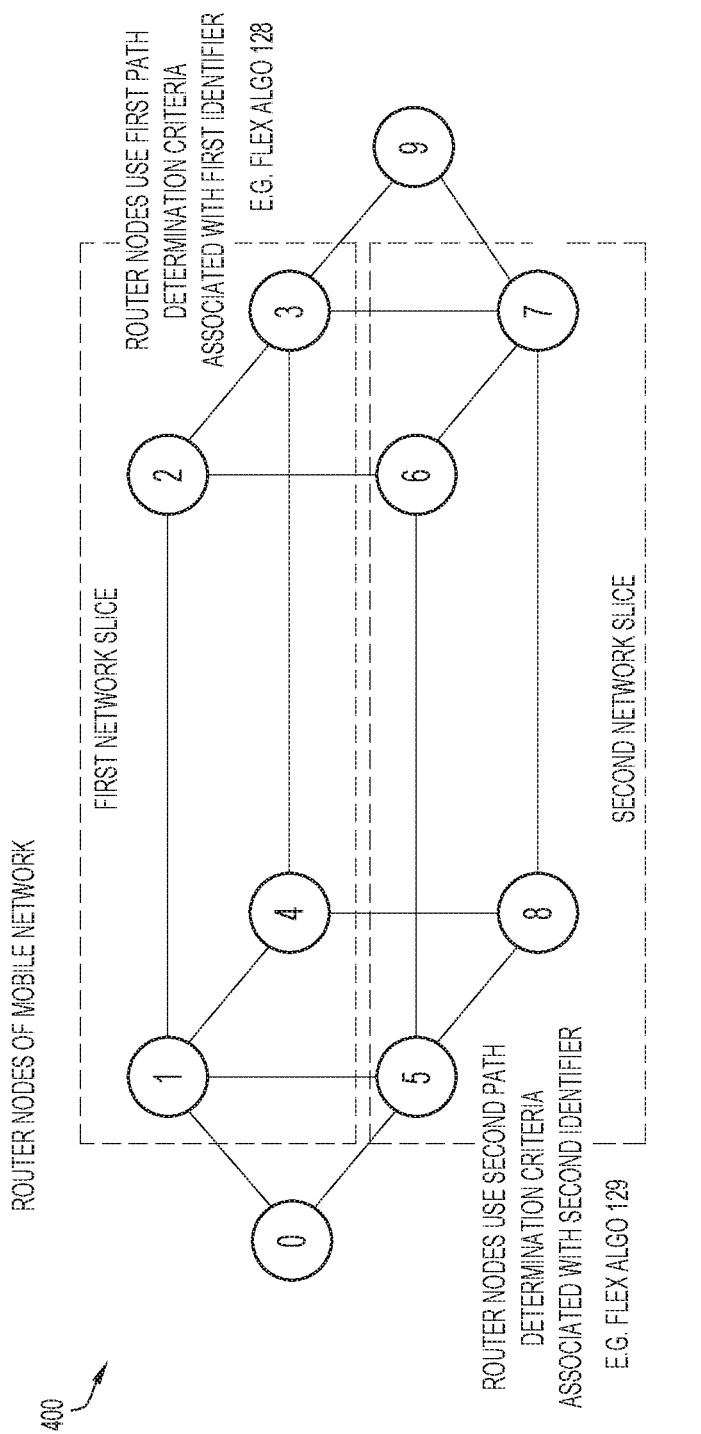
FIG. 4 is an illustrative representation of a plurality of interconnected router nodes of the mobile network, where a first plurality of router nodes are allocated to a first network slice and a second plurality of router nodes are allocated to a second network slice.

FIG. 4 is an example illustrative representation of a plurality of interconnected router nodes 400 of the mobile network to better illustrate the context as described in relation to FIG. 3. A first plurality of router nodes 1, 2, 3, and 4 are allocated to a first network slice, and a second plurality of router nodes 5, 6, 7, and 8 are allocated to a second network slice. Each router node 1, 2, 3 4 of the first network slice may being configured to establish routes based on first path determination criteria associated with a first identifier. More specifically, each router node 1, 2, 3, and 4 of the first network slice may be configured to populate its forwarding table with forwarding table entries of paths determined according to the first path determination criteria (and e.g. mostly limit its entries to such determined paths). On the other hand, each router node 5, 6, 7, and 8 of the second network slice may be configured to establish routes based on second path determination criteria associated with a second identifier. More specifically, each router node 5, 6, 7, and 8 of the second network slice may be configured to populate its forwarding table with forwarding table entries of paths determined according to the second path determination criteria (and e.g. mostly limit its entries to such determined paths). Such path determination criteria may be provisioned at the router nodes by a controller.

Again, as described above, the first path determination criteria of the first network slice may be a first flexible algorithm (e.g. a Flex-Algo 128) and the second path determination criteria of the second network slice may be a second flexible algorithm (e.g. a Flex-Algo 129). Here, each router node 0, 1, 2, and 3 of the first network slice may be configured to advertise a first prefix SID which includes the first identifier (e.g. Flex-Algo 128), and each router node 5, 6, 7, and 8 of the second network slice may be configured to advertise a second prefix SID which includes the second identifier (e.g. Flex-Algo 129).

In some implementations, a network slice may be created by associating a flexible algorithm value with a network slice via provisioning. In a detailed example relating to FIG. 4, the mobile network may be configured to provide the following:
(1) A "North Slice" (i.e. the first network slice) may include router nodes 1, 2, 3, and 4, may use shared router nodes 0 and 9, and may be instantiated using Flex-Algo 128
(2) A "South Slice" (i.e. the second network slice) may include nodes 5, 6, 7, and 8, may use shared router nodes 0 and 9, and may be instantiated using Flex-Algo 129
(3) The "Default Slice" may include nodes 0-9 and be associated with the Flex-Algo 0
(4) Router nodes 0 and 9 are a part of all or both network slices If a router node advertises participation in a Flex-Algo, it also advertises a prefix SID for that Flex-Algo. In this example, it is assumed that:
(A) Link address for the nth adjacency between XY@X: 99:X:Y::Xn
(B) Node k has a classic IPv6 loopback address Ak::/128
(C) Node k has Bk::/48 for its local SID space
(D) A SID at node k with locator block B, algorithm a, and function F is represented by B:a:k:F::
(E) The code point for the END function is 1

Given the above scheme,
(i) Router node 9 may advertise Prefix SID B:0:9:1:: for ALGO 0, Prefix SID B:128:9:1:: for ALGO 128, and Prefix SID B:129:9:1:: for ALGO 129
(ii) Router node 3 may advertise Prefix SID B:0:3:1:: for Algo 0, and Prefix SID B:128:3:1:: for ALGO 128.-SA,DA) (S3, S2, S1; SL) represents an IPv6 packet with an IPv6 header with source address SA, destination addresses DA, and next header which is an SRH. SRH (S3, S2, S1; SL) is an SRH with SID list <S1, S2, S3> with SegmentsLeft=SL Again, according to some implementations of the present disclosure, each router node may include a network slice isolation validator and use it to operate as a UUT for validating isolation between network slices of the mobile network.

Figure 5A:
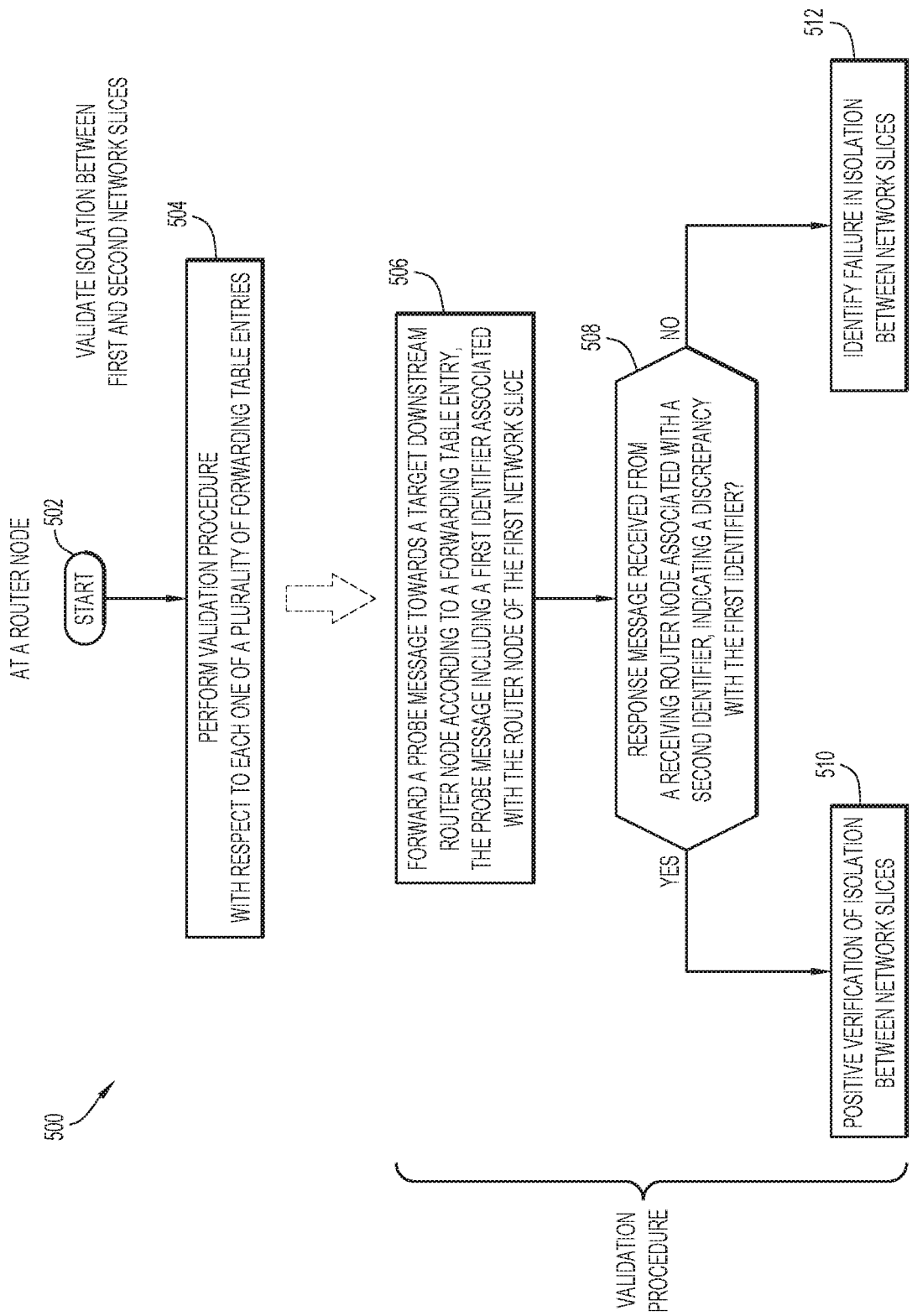
FIGS. 5A-5D are flowcharts for describing methods for use in validating isolation between network slices of a mobile network according to some implementations of the present disclosure.

To better explain, FIG. 5A is a flowchart 500A for describing a generalized method for use in validating isolation between network slices of a mobile network according to some implementations of the present disclosure. The method may be performed by a router node operating as a UUT in the mobile network (e.g. in the context described above in relation to FIGS. 3-4). The router node may include at least one or more processors, one or more memories coupled to the one or more processors, and a plurality of network interfaces. The method may be embodied as a computer program product including a non-transitory computer readable medium and instructions stored in the computer readable medium, where the instructions are executable on one or more processors for performing the steps of the method.

The mobile network includes a plurality of interconnected router nodes for routing packets according to SR. The interconnected router nodes include a first plurality of router nodes of a first network slice and a second plurality of router nodes of a second network slice. Each router node of the first network slice is configured to establish routes based on first path determination criteria associated with a first identifier, and each router node of the second network slice is configured to establish routes based on second path determination criteria associated with a second identifier. The router node operating as the UUT is part of the first network slice associated with the first identifier.

Beginning at a start block 502 of FIG. 5A, the router node may perform a validation procedure with respect to a forwarding table entry in its forwarding table (step 504 of FIG. 5A). Here, in general, the router node may forward a probe message towards a target downstream router node according to the forwarding table entry (step 506 of FIG. 5A). The probe message may include the first identifier associated with the router node in the first network slice. A response message may be received from a receiving router node associated with the second identifier, which indicates a discrepancy with the first identifier of the router node (identified at step 508 of FIG. 5A). The router node may identify this as a failure of isolation from the network resources of the second network slice (step 510 of FIG. 5A). Here, the router node may alert or otherwise indicate the identified failure to an operator of the mobile network. Otherwise, if a response message from a receiving router node associated with the second identifier is not received, as identified at step 508, the router node may consider this a positive verification of isolation between the network slices for this entry (step 512 of FIG. 5A).

In some implementations, the router node may then select a next forwarding table entry and repeat the validation procedure, until all of the forwarding table entries have been tested and validated. If all of the forwarding table entries have been tested and validated, then the router node as the UUT has been successfully validated. Again, a controller may coordinate and control each router node of the network slice to operate as a UUT as described. A report which includes a list of isolation failures, a list of successful validations, or both, may be generated and sent to the operator.

Figure 6A:
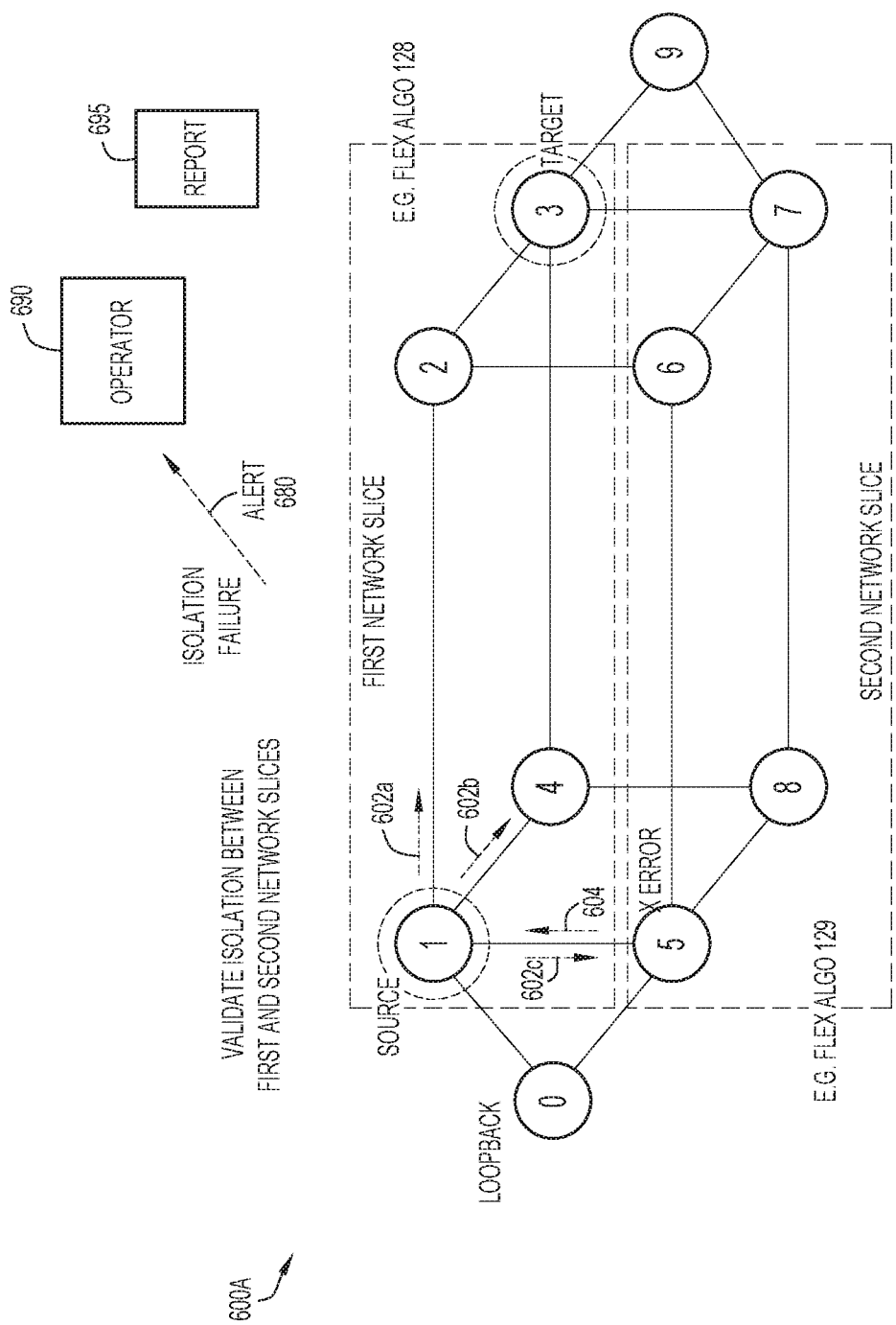

Referring ahead to corresponding FIG. 6A, an illustrative representation of a plurality of interconnected router nodes 600A for use in describing the method in the flowchart 500A of FIG. 5A is shown. In FIG. 6A, router node 1 is configured to perform validation of isolation between network slices (e.g. the first and second network slices) as the UUT. Here, router node 1 may forward a probe message 602a towards a target downstream router node 3 according to a forwarding table entry. The probe message 602a may include the first identifier associated with router node 1 in the first network slice. Router node 1 may perform such forwarding for a plurality of additional entries, for example, by forwarding a probe message 602b and a probe message 602c.

In some scenarios, a response message 604 may be received from a receiving router node 5 which is associated with the second identifier, which indicates a discrepancy with the first identifier of router node 1. Receiving router node 5 is part of the second network slice. Router node 1 of the first network slice may identify this as a failure of isolation from the network resources in the second network slice. Here, router node 1 may send an alert 680 or otherwise indicate the identified failure to an operator 690 of the mobile network. In some implementations, router node 1 may generate and send a report 695 which includes a list of isolation failures, a list of successful validations, or both, to the operator 690.

According to the present disclosure as described herein, a router node may operate to locally ensure that it does not forward one or more packets from one network slice to a resource that does not belong to that network slice. For this purpose, the router node may construct a "loopback" probe message (or "probe packet") that tests each forwarding table entry against forwarding in the correct network slice using the resources allocated to that network slice. The loopback probe message may be able to check consistency among the forwarding table entries at the line card (LC), forwarding table entries in the control plane, and control protocols that have programmed the forwarding. The loopback probe message may also able to validate that the forwarding is using the correct set of network resources assigned to the network slice.

Figure 5B:
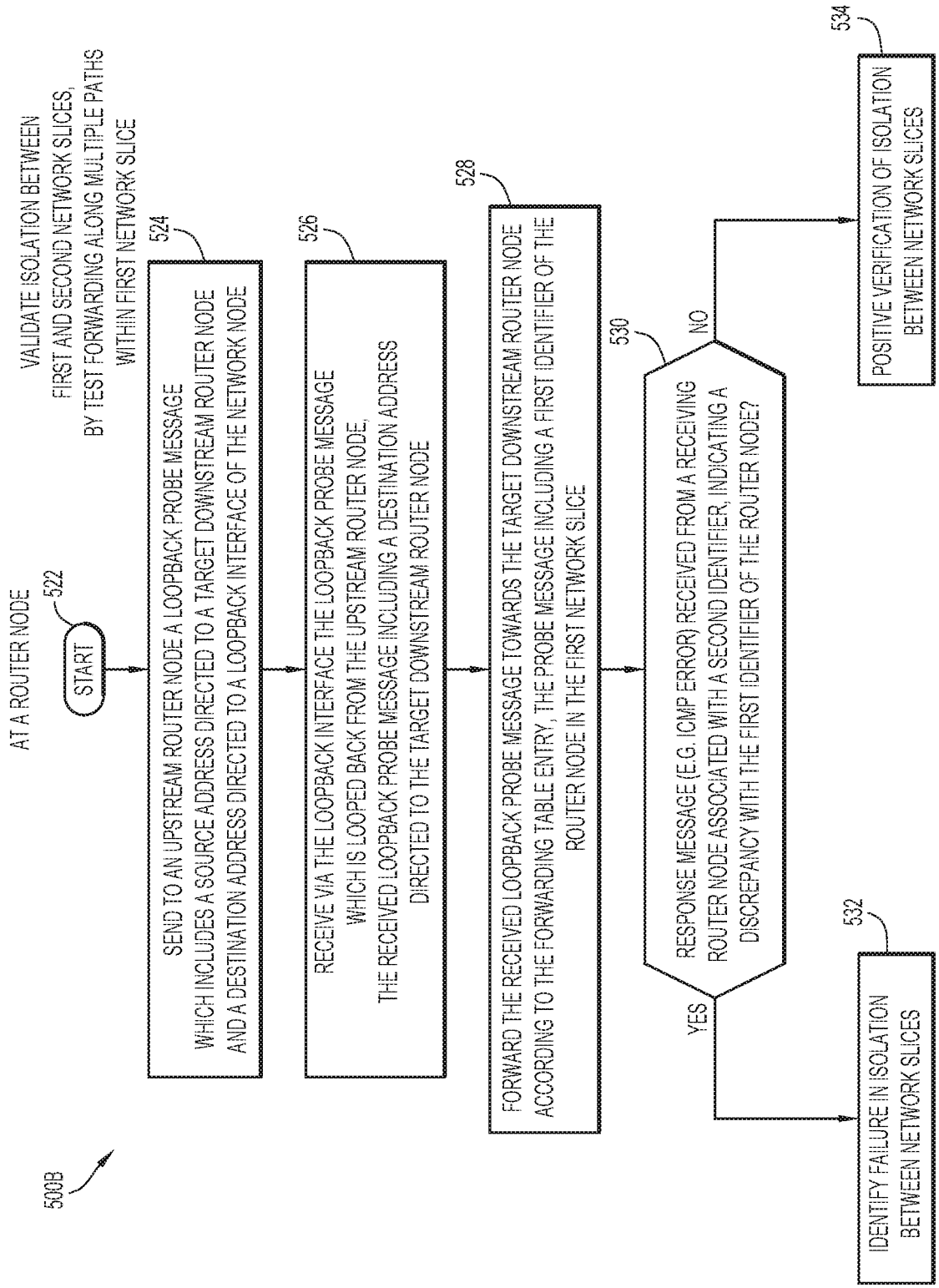

Referring now back to FIG. 5B, a flowchart 500B for describing a method for use in validating isolation between network slices of a mobile network according to some implementations of the present disclosure is shown. The method may be performed by a router node operating as a UUT in the mobile network (e.g. in the context described above in relation to FIGS. 3-4). The router node may include at least one or more processors, one or more memories coupled to the one or more processors, and a plurality of interfaces. The method may be embodied as a computer program product including a non-transitory computer readable medium and instructions stored in the computer readable medium, where the instructions are executable on one or more processors for performing the steps of the method. Again, the mobile network includes a plurality of interconnected router nodes for routing packets according to SR. The interconnected router nodes include a first plurality of router nodes of a first network slice and a second plurality of router nodes of a second network slice. Each router node of the first network slice is configured to establish routes based on first path determination criteria associated with a first identifier, and each router node of the second network slice is configured to establish routes based on second path determination criteria associated with a second identifier. The router node operating as the UUT is part of the first network slice associated with the first identifier.

What is described in relation to FIG. 5B is a more specific example of the method described in relation to FIG. 5A, and relates to validating isolation between network slices by test forwarding along multiple paths within the network slice. Beginning at a start block 522 of FIG. 5B, the router node may perform a validation procedure with respect to a forwarding table entry in its forwarding table. Here, the router node may inject or otherwise send to an upstream router node a loopback probe message (or probe packet) which includes a source address directed to a target downstream router node and a destination address directed to a loopback interface of the router node (step 524 of FIG. 5B). In response, the router node (i.e. the UUT) may receive via the loopback interface the loopback probe message which is looped back from the upstream router node (step 526 of FIG. 5B). The received loopback probe message may include a destination address directed to the target downstream router node. The router node may forward the received loopback probe message towards the target downstream router node according to the forwarding table entry (step 528 of FIG. 5B). The forwarded probe message may include the first identifier associated with the router node in the first network slice.

In some scenarios, a response message may be received from a receiving router node associated with the second identifier, which indicates a discrepancy with the first identifier of the router node (identified at step 530 of FIG. 5B). In this example, the response message may be an Internet Control Message Protocol (ICMP) message from the receiving router node, which may operate to compare the first and the second identifiers and, upon identifying a mismatch, send the ICMP. The router node may identify the receipt of this response message as a failure of isolation from the network resources of the second network slice (step 532 of FIG. 5B). Here, the router node may alert or otherwise indicate the identified failure to an operator of the mobile network. If such response message from a receiving router node associated with the second identifier is not received, as identified at step 530, the router node may consider this a positive verification of isolation between the network slices for this entry (step 534 of FIG. 5B).

In some implementations, the router node may then select a next forwarding table entry and repeat the validation procedure, until all of the forwarding table entries have been tested and validated. If all of the forwarding table entries have been tested and validated, then the router node as the UUT has been successfully validated. Again, a controller may coordinate and control each router node of the network slice to operate as a UUT as described. A report which includes a list of isolation failures, a list of successful validations, or both, may be generated and sent to the operator.

Figure 6B:
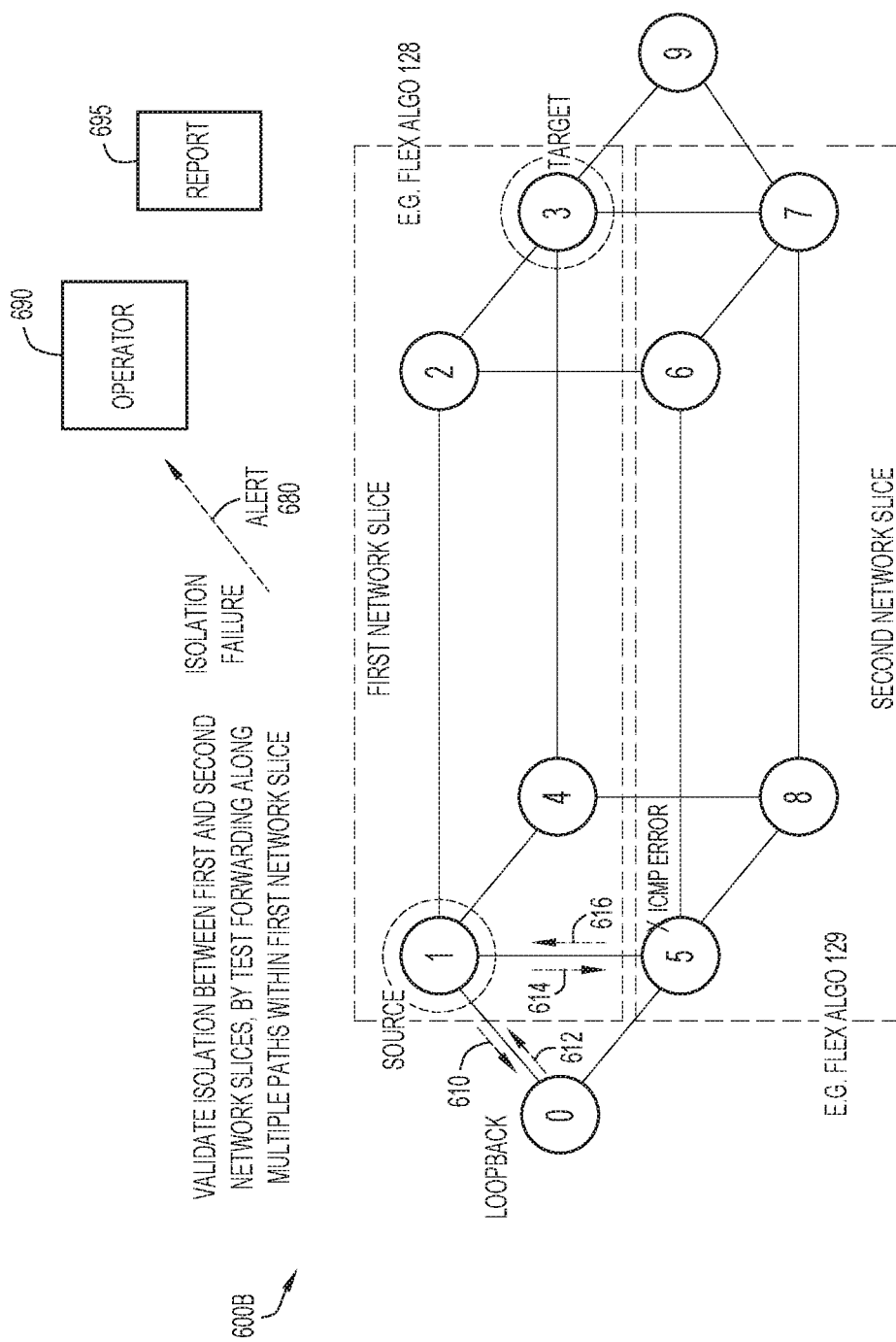

Referring ahead to corresponding FIG. 6B, an illustrative representation of a plurality of interconnected router nodes 600B for use in describing the method in the flowchart 500B of FIG. 5B is shown. Again in FIG. 6B, router node 1 is configured to perform validation of isolation between network slices (e.g. the first and second network slices) as the UUT. Here, router node 1 may inject a loopback probe message 610 to an upstream router node 0. The loopback probe message 610 may include a source address directed to a target downstream router node 3 and a destination address directed to a loopback interface of router node 1. In response, router node 1 may receive via the loopback interface the loopback probe message 612 which is looped back from the upstream router node 0. This received loopback probe message 612 may include a destination address directed to the target downstream router node 3. Router node 1 may (attempt to) forward the received loopback probe message 614 towards the target downstream router node 3 according to its forwarding table entry. The forwarded probe message 614 may include the first identifier associated with router node 1 in the first network slice.

In some scenarios, a response message 616 may be received from receiving router node 5 which is associated with the second identifier, which indicates a discrepancy with the first identifier of router node 1. In this example, the response message 616 may be an ICMP message from the receiving router node 5, which operates to compare the first and the second identifiers and, upon identifying a mismatch, sends the ICMP. Router node 1 in the first network slice may identify this as a failure of isolation from the network resources in the second network slice. Here, router node 1 may send the alert 680 or otherwise indicate the identified failure to the operator 690 of the mobile network. In some implementations, router node 1 may generate and send the report 695 which includes a list of isolation failures, a list of successful validations, or both, to the operator 690.

Discussing FIG. 6B again in relation to the detailed example described earlier in relation to FIG. 4, router node 1 as the UUT may test forwarding SID B:128:3:1:: to ensure that it only gets forwarded to downstream nodes participating in Flex-Algo 128 (e.g. router nodes 2 and 4). Note that B:128:3:1:: is the END SID at router node 3 which participates (e.g. only) in Flex-Algo 128. If adequate isolation exists, the loopback probe message 610 should not leak to router node 5 which is not participating in Flex-Algo 128.

In some implementations, the router node 1 may operate to test all (or at least most) of the possible paths that any customer data packet may exercise. This testing may include testing all (or at least most) of the ingress and egress line card forwarding across available equal-cost multi-paths (ECMPs). This may be achieved by injecting the loopback probe message 610 towards upstream router node 0 and looping it back to a targeted line card, by using an adjacency SID at the upstream router node 0 towards the targeted line card. In the detailed example, the loopback probe message 610 sent by router node 1 on the interface to router node 0 will be (A1::, 99:0:1::0) (B:128:3:1::, SL=1, 0=1). Due to use of the adjacency SID 99:0:1::0, router node 0 may process the SRH and send the loopback probe message 612 (A1::, B:128:3:1::)(B:128:3:1::, SL=1, 0=1) back to router node 1. Here, the SRH.0 bit may be set so that the SRH is not removed.

In some implementations, the above-described detection mechanism may be distributed to only local and neighboring router nodes, rather than sending an end-to-end probe packet (e.g. to router node 3). By validating that each router node (i.e. UUT) correctly forwards traffic in the network slice for any ECMP, end-to-end validation may be effectively achieved without its inherent scale limitations. In some implementations, this object may be achieved by setting a time-to-live (TTL) value of the loopback probe message to a limited number, such as three (3) (e.g. travel upstream, return to the UUT, and expire at immediate downstream router node).

In some implementations, an Interface Information Object of an ICMP Extension may be used to identify a receiving interface name that receives the probe packet. The Interface Information Object of ICMP Extension is described in "Extending ICMP for Interface and Next-Hop Identification," IETF, Request for Comments: 5837; A. Atlas, Ed. et al., April 2010. In general, RFC 5837 specifies that the receiving interface name, the IP address, or the "ifIndex" may be encoded in an ICMP message by a responding router node. Here, in some implementations, the downstream router node may validate the probe message and encode the result along with the Interface Information Object that identifies the receiving interface name of the message back to the UUT in the ICMP message. The UUT may then validate the correct forwarding within the network slice and identify any leaks to an incorrect network slice by examining the receiving interface name in the Interface Information Object of the ICMP message.

Back to the detailed example, router node 1 may reach the target SID B:128:3:1 via an ECMP path towards router node 2 or 4. If the forwarded probe message 614 is incorrectly switched to router node 5, however, router node 5 may check the target algorithm value in the forwarded probe message 614. The target algorithm value (e.g. the Flex-Algo value) in the forwarded probe message 614 will be Flex-Algo 128; however, router node 5 does not support Flex-Algo 128. Here, router node 5 may return a failure message to the UUT along with the Interface Information Object that specifies the ingress link.

Thus, once the probe message is switched to the immediate downstream router node, the node may check if it implements the target algorithm value (e.g. that it is part of the target network slice and the interface on which the probe message is received is a member of such slice). If the downstream router node does not support the targeted algorithm, or the receiving interface is not part of the target network slice, the neighboring router node may return an error. Note that additional information in the Interface Information Object may allow the UUT to also identify a condition where the control plane may be out-of-sync (e.g. the downstream router node may return a success indication, but the link in the Interface Information Object may not be recognized or targeted by the UUT).

Figure 5C:
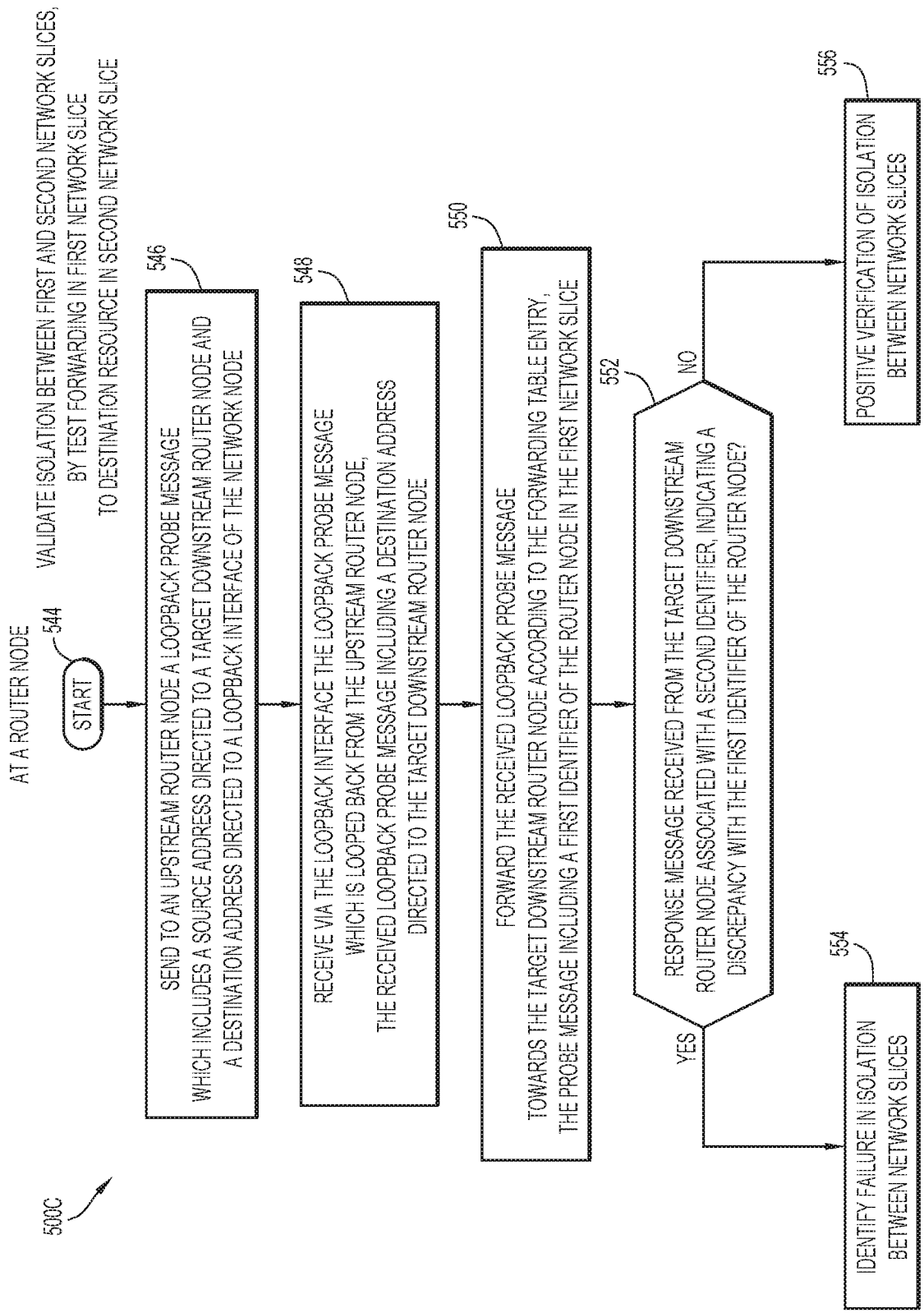

Referring now back to FIG. 5C, a flowchart 500C for describing a method for use in validating isolation between network slices of a mobile network according to some implementations of the present disclosure is shown. The method may be performed by a router node operating as a UUT in the mobile network (e.g. in the context described above in relation to FIGS. 3-4). The router node may include at least one or more processors, one or more memories coupled to the one or more processors, and a plurality of network interfaces. The method may be embodied as a computer program product including a non-transitory computer readable medium and instructions stored in the computer readable medium, where the instructions are executable on one or more processors for performing the steps of the method.

What is described in relation to FIG. 5C is a more specific example of the method described in relation to FIG. 5A, and relates to validating isolation between network slices by test forwarding in the first network slice to an (invalid) destination resource in the second network slice. Beginning at a start block 544 of FIG. 5C, the router node may perform a validation procedure with respect to a forwarding table entry in its forwarding table. Here, the router node may inject or otherwise send to an upstream router node a loopback probe message which includes a source address directed to a target downstream router node and a destination address directed to a loopback interface of the router node (step 546 of FIG. 5C). The target downstream router node may be part of the second network slice (i.e. an invalid destination). An END.OP SID may be inserted in the SRH of the loopback probe message before the target END SID, for verification of whether the probe message was received and dropped at a leaked device due to leakage detection.

In response, the router node may receive via the loopback interface the loopback probe message which is looped back from the upstream router node (step 548 of FIG. 5C). The received loopback probe message may include a destination address directed to the target downstream router node in the second network slice, as well as the additional END.OP SID. The router node may forward the received loopback probe message towards the target downstream router node according to the forwarding table entry (step 550 of FIG. 5C). The probe message may include the first identifier associated with the router node in the first network slice.

In some scenarios, a response message may be received from a receiving router node associated with the second identifier, which indicates a discrepancy with the first identifier of the router node (identified at step 552 of FIG. 5C). In this example, the response message may be an acknowledgement or OK message (e.g. an EOK message) from the target downstream router node in the second network slice. Here, upon receipt of the response message, the router node may operate to compare the first identifier with the second identifier in the response message. Upon identifying a mismatch, the router node may identify a failure of isolation from the network resources of the second network slice (step 554 of FIG. 5C). The router node may alert or otherwise indicate the identified failure to an operator of the mobile network. If such response message from a receiving router node associated with the second identifier is not received, as identified at step 552, the router node may consider this a positive verification of isolation between the network slices for this entry (step 556 of FIG. 5C).

In some implementations, the router node may then select a next forwarding table or destination entry and repeat the validation procedure, until all of the entries have been tested and validated. If all of the entries have been tested and validated, then the router node as the UUT has been successfully validated. Again, a controller may coordinate and control each router node of the network slice to operate as a UUT as described. A report which includes a list of isolation failures, a list of successful validations, or both, may be generated and sent to the operator.

Figure 6C:
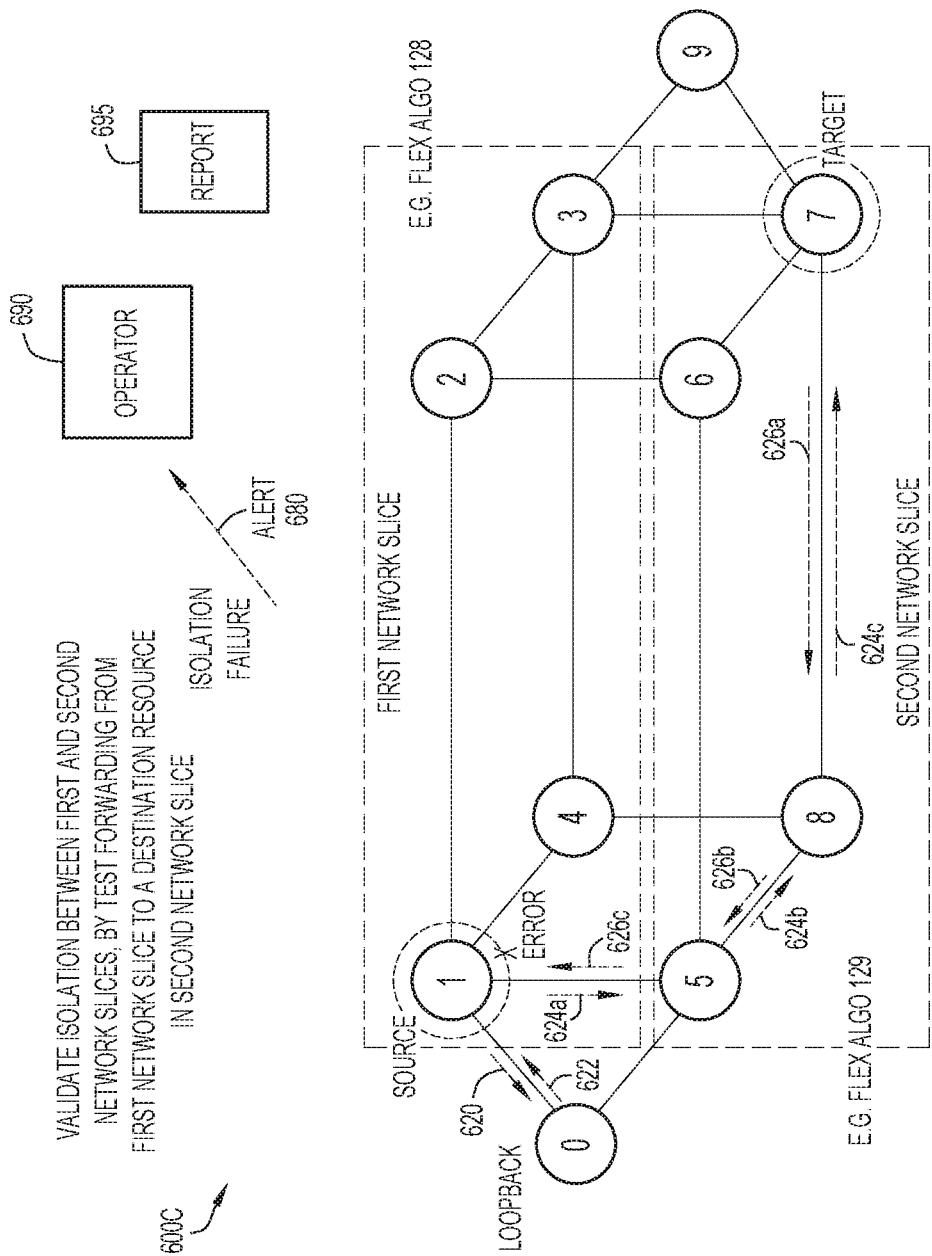

Referring now to corresponding FIG. 6C, an illustrative representation of a plurality of interconnected router nodes 600C for use in describing the method in the flowchart 500C of FIG. 5C is shown. Again, this method relates to validating isolation between network slices by test forwarding in the first network slice to a destination resource in the second network slice. In FIG. 6C, router node 1 is configured to perform validation of isolation between network slices (e.g. the first and second network slices) as the UUT. Here, router node 1 may inject a loopback probe message 620 to the upstream router node 0. The loopback probe message 620 may include a source address directed to a target downstream router node 7 and a destination address directed to a loopback interface of router node 1. Here, an additional END.OP SID may be inserted in the SRH of the loopback probe message 620 before the target END SID.

In response, router node 1 may receive via the loopback interface the loopback probe message 622 which is looped back from the upstream router node 0. The received loopback probe message 622 may include a destination address directed to the target downstream router node 7. Router node 1 may forward this probe message 624*a* towards the target downstream router node 7. This probe message 624*a* may include the first identifier associated with router node 1 in the first network slice. The forwarded probe message 624*a* is communicated in FIG. 6C as indicated as probe message 624*b* and 624*c* to target downstream router node 7.

A response message may be communicated from target downstream router node 7 to router node 1 as indicated in the communication of response messages 626*a*, 626*b*, and 626*c*. As the response message 626*c* is received from target downstream router node 7 which is associated with the second identifier, this indicates a discrepancy with the first identifier associated with router node 1. Again, the response message 626*c* may be an acknowledgement or OK message (e.g. an EOK message) from the target downstream router node 7. Here, upon receipt of the response message 626*c*, the router node 1 may operate to compare the first identifier with the second identifier in the response message 626*c*. Upon identifying a mismatch, the router node 1 may identify a failure of isolation from the network resources of the second network slice.

Discussing FIG. 6C again in relation to the detailed example, note that the operator 690 may want to ensure that the UUT is not able to forward traffic to a destination prefix that is not part of the local network slice. The UUT may prove that by generating a probe packet to target a prefix SID in a different network slice that utilizes Flex-Algo 129. Again, router node 1 utilizes Flex-Algo 128 and does not participate in Flex-Algo 129. Hence, router node 1 should not be able to forward traffic to any prefix SID belonging to Flex-Algo 129 (i.e. the second network slice). Note that leaked packets typically just get dropped in microcode at the device.

Accordingly, in some implementations, a mechanism that verifies that such a probe packet was received and dropped at the leaked device due to leakage is provided. Again, this may be achieved by appending an additional END.OP SID in the SRH of the probe packet before the target END SID. In the detailed example, B:128:7:1 (router node 7) should not have a forwarding path from router node 1. To validate resource isolation, loopback probe message 620 sent by router node 1 on interface to router node 0 will be (A1::, 99:0:1::0) (B:129:7:1::, B:129:7:2::, SL=2). Here, B:129:7:2 is the END.OP SID advertised by router node 7 for the second network slice. Router node 0 will loopback the loopback probe message 612 from the upstream router node 0 back to router node 1 before forwarding it downstream. The forwarded probe message 624*a* may be constructed as (A1::, B:129:7:2::) (B:129:7:1::, B:129:7:2::, SL=1) or the like.

As router node 1 is not part of the second network slice, the forwarded probe message would be dropped by the microcode at the line card according to conventional operation. However, if there is a mis-programming at router node 1 and it is able to forward the probe message to B:129:7:2::, router node 7 will implement the END.OP SID behavior and check the next SID (B:129:7:1::) for being local. As B:129:7:1:: is a local SID at router node 7, it will respond with an EOK message. Hence, router node 1 is able to detect that it is able to forward traffic to a different network slice (e.g. due to mis-programming or the like).

Figure 5D:
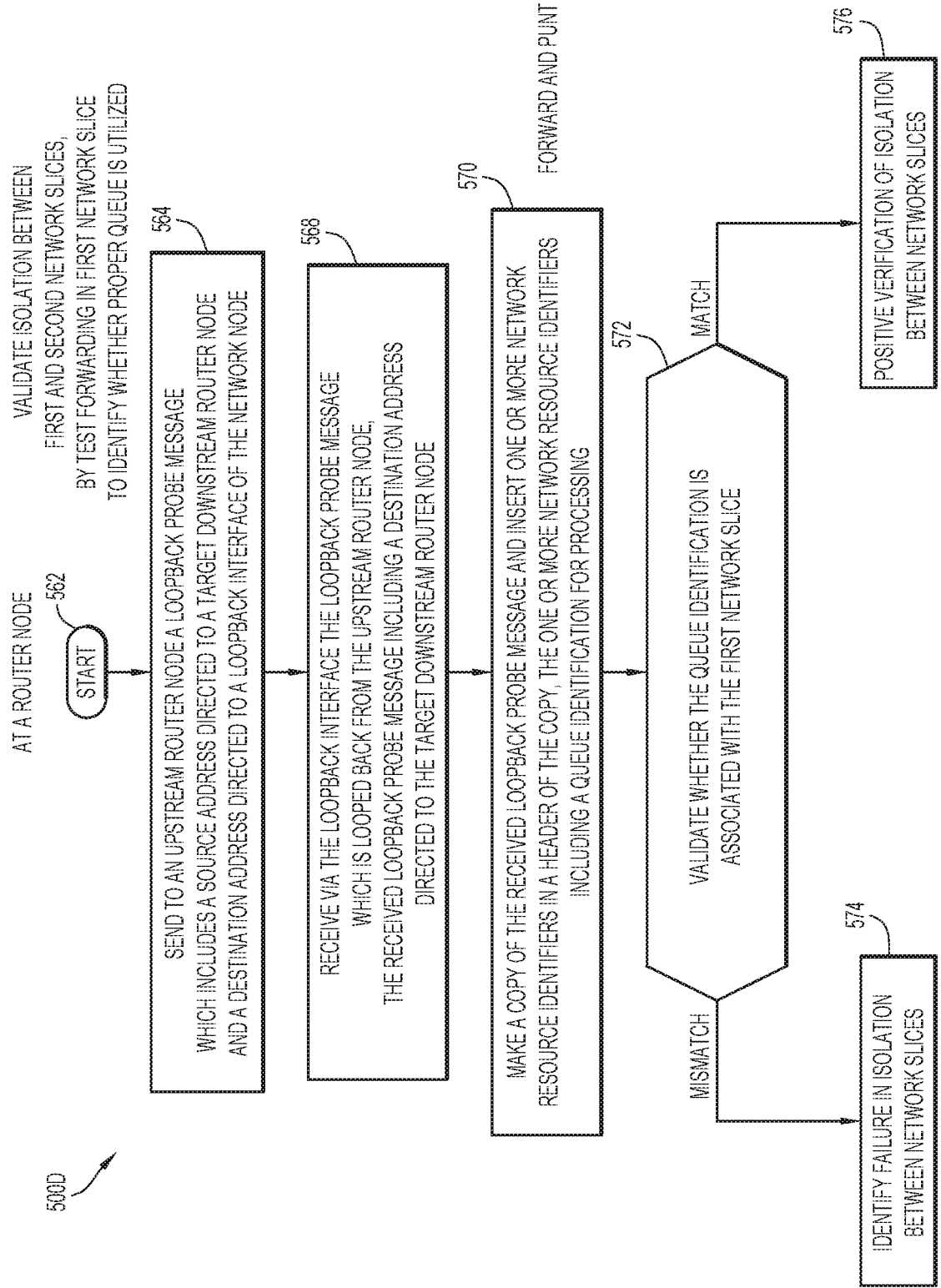

Referring now back to FIG. 5D, a flowchart 500D for describing a method for use in validating isolation between network slices of a mobile network according to some implementations of the present disclosure is shown. The method may be performed by a router node operating as a UUT in the mobile network (e.g. in the context described above in relation to FIGS. 3-4). The router node may include at least one or more processors, one or more memories coupled to the one or more processors, and a plurality of network interfaces. The method may be embodied as a computer program product including a non-transitory computer readable medium and instructions stored in the computer readable medium, where the instructions are executable on one or more processors for performing the steps of the method.

What is described in relation to FIG. 5D relates to performing validation in the first network slice to identify whether a proper queue indicative of QoS of the first network slice is being utilized. Beginning at a start block 562 of FIG. 5D, the router node may perform a validation procedure with respect to a forwarding table entry in its forwarding table. Here, the router node may send to an upstream router node a loopback probe message which includes a source address directed to a target downstream router node and a destination address directed to a loopback interface of the router node (step 564 of FIG. 5D). The target downstream router node may be part of the second network slice. In response, the router node may receive via the loopback interface the loopback probe message which is looped back from the upstream router node (step 568 of FIG. 5D). The received loopback probe message may include a destination address directed to the target downstream router node in the second network slice.

Upon receipt, the router node may make a copy of the message and insert one or more network resource identifiers in a header of the copied message (step 570 of FIG. 5D). The one or more network resource identifiers may include a queue identification for processing the message. The queue identification is associated with a QoS level associated with the network slice. The router node may also forward the received loopback probe message towards the target downstream router node according to the forwarding table entry.

In some implementations, the making of the copy having the network resource identifiers may be performed as part of a forwarding and punting a copy of the message (i.e. punt a copy of the received packet after forwarding it). In SRv6 Network Programming (draft-filsfils-spring-srv6-network-programming-04) described earlier above, an SRH.Flags.O-bit is defined to instruct a "forward and punt a copy of the packet" behavior (i.e. punt the copy of the received packet after forwarding it). A "forward and punt a copy of the packet" processes a packet without head-of-line blocking in switching the packet, and hence is efficient and hardware-friendly. The router node that may implement the forward and punt behavior is assumed to punt the entire packet, including an internal header of the packet.

Typically, a router node may process a packet at one of a plurality of different switching method levels. "Punting" may be characterized or viewed as an action by an interface's device driver of sending a packet "down" to the next lower switching level for communication. As one specific example, a list of switching method levels or paths in order from fastest to slowest may be as follows: (1) a distributed express-forwarding of a packet with use of a hardware application-specific integrated circuit (ASIC); (2) a (non-distributed) express forwarding of a packet with use of the hardware ASIC; (3) a fast switching; and (4) a process switching. The first two switching method levels ("fast paths") make use of hardware ASICs in the devices, but others may make use of a slower path in software associated with a route processor (RP) CPU.

The router node may then verify whether the queue identification in the copied message is associated with the first network slice (e.g. based on a stored policy at the router node) (step 572 of FIG. 5D). Upon identifying a mismatch, the router node may identify a failure of isolation between network slice operation (step 574 of FIG. 5D). Here, the router node may alert or otherwise indicate the identified failure to an operator of the mobile network. If a mismatch is not identified at step 572, the router node may consider this as a positive verification (step 576 of FIG. 5D).

In some implementations, the router node may then select a next forwarding table or destination entry and repeat the validation procedure, until all of the entries have been tested and validated. If all of the entries have been tested and validated, then the router node as the UUT has been successfully validated. Again, a controller may coordinate and control each router node of the network slice to operate as a UUT as described. A report which includes a list of isolation failures, a list of successful validations, or both, may be generated and sent to the operator.

Referring now to corresponding FIG. 6D, an illustrative representation of a plurality of interconnected router nodes 600D for use in describing the method in the flowchart 500D of FIG. 5D is shown. Again, this method relates to performing validation in the first network slice by test to identify whether a proper queue in the router node associated with the first network slice is being utilized. In FIG. 6D, router node 1 is configured to perform validation of isolation between network slices (e.g. the first and second network slices) as the UUT. Here, router node 1 may inject a loopback probe message 630 to an upstream router node 0, where the loopback probe message 630 includes a source address directed to a target downstream router node and a destination address directed to a loopback interface of the router node. The router node 1 may receive via the loopback interface a returned loopback probe message 632 which is looped back from the upstream router node 0. The received loopback probe message 632 may include a destination address directed to the target downstream router node.

The router node 0 may make a copy 636 of the received loopback probe message 632 insert one or more network resource identifiers in a header of the packet copy 636. The one or more network resource identifiers may include a queue identification for processing the received loopback probe message. The queue identification of the queue may be associated with a QoS level. The router node 0 may verify from the packet copy 636 whether the queue identification is associated with the first network slice. A forwarded probe message 634 which is the original packet may be forwarded towards the destination router node. As described earlier, router node 0 may implement a "forward and punt a time-stamped copy of the packet" behavior to achieve this processing (i.e. punt the copy of the received packet after forwarding it).

Reviewing FIG. 6D again in relation to the detailed example, note that in an SR network, a single queue may be used for all traffic forwarded to a given network slice. To validate that the UUT is applying the correct QoS queues allocated to the target network slice, the UUT may initiate the loopback probe message 630 with the SRH.Flags.O=1. Consequently, the loopback probe message 630 may loop back to the UUT as the received loopback probe message 632 with an OAM marking set according to Ultimate Segment Pop (USP). As described above, the 0-bit in SRv6 instructs the "forward and punt" behavior for packet process. Further, when the 0-bit is set, the UUT may record, based on its local policy, resources (e.g., queue identification of the queue utilized) in the header of the punted packet. A local process at the UUT (e.g. its CPU) may examine the header to verify that the resources used against the network slice belongs and is assigned to that network slice. In the present detailed example, the loopback probe message for B:129:7:1:: is expected to use the queue associated with Flex-Algo 129. When the loopback probe message 630 with SRH.Flags.O=1 is looped back to router node 1, it may record the queue identification in the copied packet header of packet copy 636 and verify the information after the packet is punted to the CPU.

Figure 7:
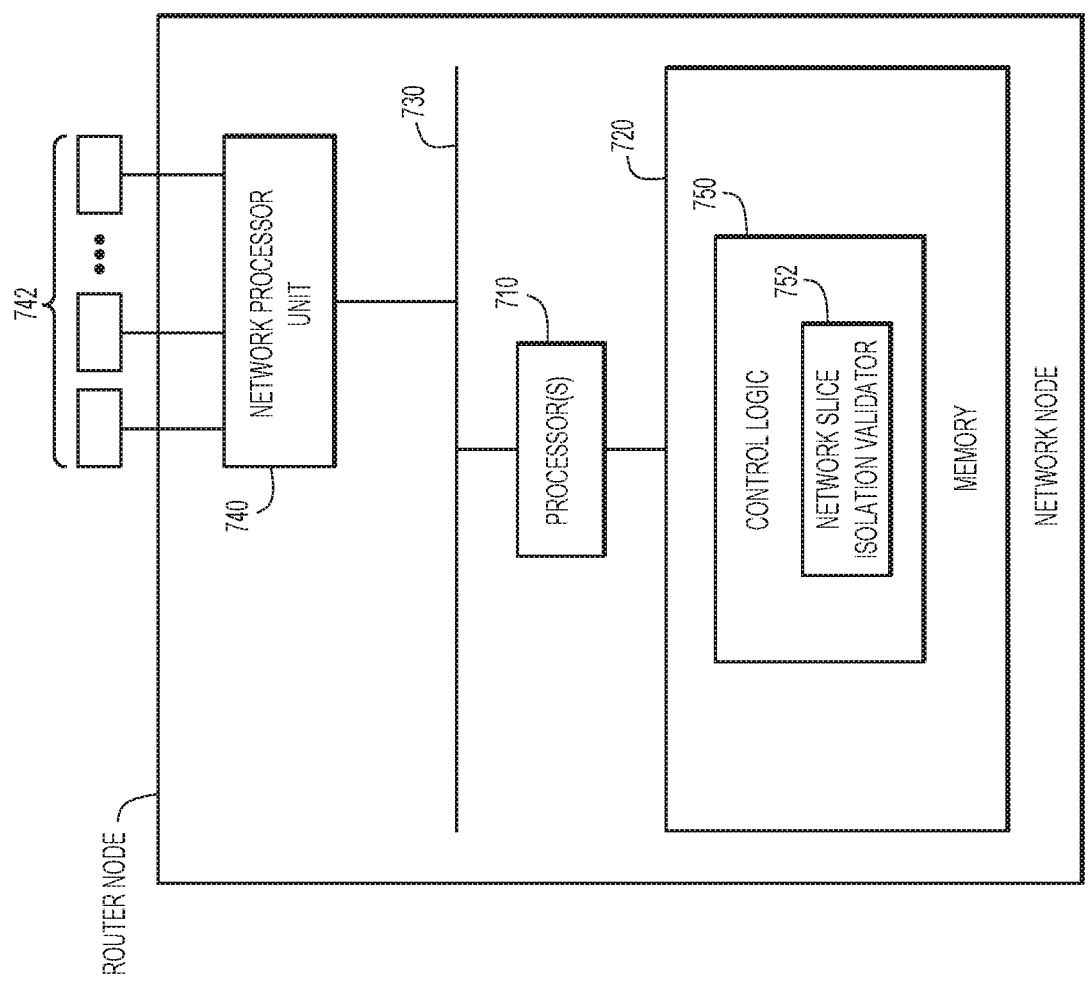
FIG. 7 illustrates a block diagram of a network or router node (e.g. a router or switch) configured to perform operations described herein.

FIG. 7 illustrates a block diagram of a network or router node (e.g. a router or switch) configured to perform operations described above in association with the figures. The node includes one or more control processors 710, memory 720, a bus 730 and a network processor unit 740. The control processor 710 may be a microprocessor or microcontroller. The network processor unit 740 may include one or more ASICs, line cards, etc., and facilitates network communications between the node and other network nodes.

There are a plurality of network ports 742 at which the node 700 receives packets and from which the node sends packets into the network. The processor 710 executes instructions associated with software stored in memory 720. Specifically, the memory 720 stores instructions for control logic 750 that, when executed by the processor 710, causes the processor 710 to perform various operations on behalf of the node as described herein. Control logic 750 may include a network slice isolation validator 752 operative in accordance with techniques of the present disclosure. The memory 720 may also store configuration information received from a network controller to configure the network node according to desired network functions. It should be noted that in some embodiments, the control logic 750 may be implemented in the form of firmware implemented by one or more ASICs as part of the network processor unit 740.

The memory 720 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 720 may comprise one or more tangible (non-transitory) computer readable storage media (e.g., a memory device) encoded with software comprising computer executable instructions and when the software is executed (by the processor 710) it is operable to perform certain network node operations described herein.

Note that a node may have several separate functional elements, although one or more of the functional elements may be combined and may be implemented by combinations of software-configured elements and/or other hardware elements. Functional elements may refer to one or more processes operating on one or more processing elements. Examples of software and/or hardware configured elements include Digital Signal Processors (DSPs), one or more microprocessors, DSPs, Field-Programmable Gate Arrays (FPGAs), Radio-Frequency Integrated Circuits (RFICs), ASICs, etc.

Also note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Some implementations of the present disclosure have been shown to utilize SRv6; however, techniques and mechanisms of the present disclosure may utilize other suitable types of routing techniques, such as MPLS. Further, some implementations of the present disclosure have been shown to apply to a 5G mobile network; however, techniques and mechanisms of the present disclosure may be applied to other suitable types of networks that employ network slicing, including other mobile networks such as 4G, Long Term Evolution (LTE) networks having control and user plane separation (CUPS).

It will also be understood that, although the terms "first," "second," etc. may be used herein to describe various elements, these elements should not be limited by these terms. These terms are used to distinguish one element from another. For example, first router node could be termed second router node, and similarly, second router node could be termed first router node, without changing the meaning of the description, so long as all occurrences of the "first router node" are renamed consistently and all occurrences of the "second router node" are renamed consistently. The first router node and second router node are both router nodes, but they are not the same router node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a router node configured for use in a network having a plurality of interconnected router nodes for routing packets according to segment routing (SR), the interconnected router nodes including a first plurality of router nodes of a first network slice and a second plurality of router nodes of a second network slice, each router node of the first network slice being configured to establish routes based on first path determination criteria associated with a first identifier and each router node of the second network slice being configured to establish routes based on second path determination criteria associated with a second identifier, the router node being one of the first plurality of router nodes allocated to the first network slice and configured to validate isolation from network resources of the second network slice by:
   performing a validation procedure with respect to each one of a plurality of forwarding table entries at the router node, at least in part by:
      forwarding a probe message towards a target downstream router node according to a forwarding table entry of the plurality of forwarding table entries, the probe message including the first identifier; and
      when a response message is received from a receiving router node associated with the second identifier, which indicates a discrepancy with the first identifier of the router node, identifying a failure of isolation from the network resources of the second network slice.

2. The method of claim 1, further comprising:
alerting or otherwise indicating the failure to an operator of the network.

3. The method of claim 1, wherein each router node of the first plurality of router nodes is configured to populate its forwarding table with forwarding table entries of paths determined according to the first path determination criteria, and wherein each router node of the second plurality of router nodes is configured to populate its forwarding table with forwarding table entries of paths determined according to the second path determination criteria.

4. The method of claim 1, further comprising:
sending to an upstream router node the probe message comprising a loopback probe message which includes a source address directed to a target downstream router node and a destination address directed to a loopback interface of the router node; and
receiving via the loopback interface the loopback probe message which is looped back from the upstream router node, the received loopback probe message including a destination address directed to the target downstream router node,
wherein the received loopback probe message is forwarded as the probe message.

5. The method of claim 4, further comprising:
making a copy of the received loopback probe message and inserting one or more network resource identifiers in a header of the copy, the one or more network resource identifiers including a queue identification for processing the received loopback probe message; and
validating whether the queue identification is associated with the first network slice.

6. The method of claim 5, further comprising:
wherein making the copy comprises forwarding and punting a copy of the received loopback probe message, and
wherein the queue identification is associated with a Quality of Service (QoS) level.

7. The method of claim 1, further comprising:
injecting at an upstream router node the probe message which comprises a loopback probe message, the loopback probe message including a source address directed to a target downstream router node and a destination address directed to a loopback interface of the router node; and
receiving via the loopback interface the loopback probe message which is looped back from the upstream router node, the received loopback probe message including a destination address directed to the target downstream router node,
wherein the response message comprises an Internet Control Protocol Message (ICMP) message which is received based on a mismatch of the first and the second identifier at the receiving router node.

8. The method of claim 7, wherein the destination address directed to the loopback interface of the router node comprises an adjacency segment identifier (SID).

9. The method of claim 7, wherein the loopback probe message is set with a time-to-live (TTL) value to limit communication of the loopback probe message.

10. The method of claim 7, wherein the ICMP message includes an Interface Information Object which indicates a receiving interface of the loopback probe message.

11. The method of claim 1, further comprising:
injecting at an upstream router node the probe message which comprises a loopback probe message, the loopback probe message including a source address directed to a target downstream router node and a destination address directed to a loopback interface of the router node; and
receiving via the loopback interface the loopback probe message which is looped back from the upstream router node, the received loopback probe message including a destination address directed to the target downstream router node which is in the second network slice; and
identifying the discrepancy by comparing the first identifier with the second identifier included in the response message from the receiving router node which comprises the target downstream router node.

12. The method of claim 11, wherein the loopback probe message includes a segment routing header (SRH) having an END.OP segment identifier (SID) before a target END SID, for verification of whether the probe message was received and dropped at the target downstream router node in the second network slice.

13. The method of claim 1, further comprising:
wherein the first path determination criteria are associated with a first flexible algorithm and the second path determination criteria are associated with a second flexible algorithm, and wherein each router node of the first network slice is configured to advertise a first prefix segment identifier (SID) which includes the first identifier and each router node of the second network slice is configured to advertise a second prefix SID which includes the second identifier, or
wherein packets routed according to SR comprises one of SR for IPv6 (SRv6) or SR-Multiprotocol Label Switching (SR-MPLS), or
wherein the network comprises a 5G mobile network.

14. A router node configured for use in a network having a plurality of interconnected router nodes for routing packets according to segment routing (SR), the interconnected router nodes including a first plurality of router nodes of a first network slice and a second plurality of router nodes of a second network slice, each router node of the first network slice being configured to establish routes based on first path determination criteria associated with a first identifier and each router node of the second network slice being configured to establish routes based on second path determination criteria associated with a second identifier, the router node comprising:
one or more processors;
a plurality of network interfaces;
the one or more processors being configured to validate isolation from network resources in the second network slice by:
performing a validation procedure with respect to each one of a plurality of forwarding table entries of the router node, at least in part by:
forwarding a probe message towards a target downstream router node according to a forwarding table entry of the plurality of forwarding table entries, the probe message including the first identifier; and
when a response message is received from a receiving router node associated with the second identifier, which indicates a discrepancy with the first identifier of the router node, identifying a failure of isolation from network resources of the second network slice.

15. The router node of claim 14, wherein the validation procedure is further performed at least in part by:
alerting or otherwise indicating the failure to an operator of the network.

16. The router node of claim 14, wherein the validation procedure is further performed at least in part by:
- injecting at an upstream router node the probe message which comprises a loopback probe message, the loopback probe message including a source address directed to a target downstream router node and a destination address directed to a loopback interface of the router node; and
- receiving via the loopback interface the loopback probe message which is looped back from the upstream router node, the received loopback probe message including a destination address directed to the target downstream router node,
- wherein the response message comprises an Internet Control Protocol Message (ICMP) message which is received based on a comparison and mismatch of the first and the second identifier at the receiving router node.

17. The router node of claim 14, wherein the validation procedure is further performed at least in part by:
- injecting at an upstream router node the probe message which comprises a loopback probe message, the loopback probe message including a source address directed to a target downstream router node and a destination address directed to a loopback interface of the router node; and
- receiving via the loopback interface the loopback probe message which is looped back from the upstream router node, the received loopback probe message including a destination address directed to the target downstream router node which is in the second network slice; and
- identifying the discrepancy by comparing the first identifier with the second identifier included in the response message from the receiving router node which comprises the target downstream router node.

18. A method comprising:
- at a router node configured for use in a network having a plurality of interconnected router nodes for routing packets according to segment routing (SR), the interconnected router nodes including a first plurality of router nodes of a first network slice and a second plurality of router nodes of a second network slice, each router node of the first network slice being configured to establish routes based on first path determination criteria associated with a first identifier and each router node of the second network slice being configured to establish routes based on second path determination criteria associated with a second identifier, the router node being one of the first plurality of router nodes allocated to the first network slice and configured to validate isolation from network resources of the second network slice by:
    - performing a validation procedure at least in part by:
        - sending to an upstream router node a loopback probe message which includes a source address directed to a target downstream router node and a destination address directed to a loopback interface of the router node;
        - receiving via the loopback interface the loopback probe message which is looped back from the upstream router node, the received loopback probe message including a destination address directed to the target downstream router node;
        - making a copy of the received loopback probe message and inserting one or more network resource identifiers in a header of the copy, the one or more network resource identifiers including a queue identification for processing the received loopback probe message; and
        - verifying whether the queue identification is associated with the first network slice.

19. The method of claim 18, wherein making the copy is performed as part of a forwarding and punting a copy of the received loopback probe message.

20. The method of claim 18, wherein the queue identification is associated with a Quality of Service (QoS).

* * * * *